US011904789B1

(12) United States Patent
Llamazares Domper et al.

(10) Patent No.: US 11,904,789 B1
(45) Date of Patent: Feb. 20, 2024

(54) MOVABLE STRUCTURES

(71) Applicant: APPLE INC., Cupertino, CA (US)

(72) Inventors: Arturo Llamazares Domper, San Jose, CA (US); Nicholas A. White, Sunnyvale, CA (US); Alexander M. Zoellner, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/124,068

(22) Filed: Mar. 21, 2023

Related U.S. Application Data

(63) Continuation of application No. 17/903,352, filed on Sep. 6, 2022, which is a continuation of application No. 17/318,333, filed on May 12, 2021, now Pat. No. 11,465,578.

(60) Provisional application No. 63/050,125, filed on Jul. 10, 2020.

(51) Int. Cl.
*B60R 21/207* (2006.01)
*B60N 3/00* (2006.01)
*B60R 21/013* (2006.01)

(52) U.S. Cl.
CPC .......... *B60R 21/207* (2013.01); *B60N 3/001* (2013.01); *B60R 21/013* (2013.01)

(58) Field of Classification Search
CPC ..................................................... B60N 3/001
See application file for complete search history.

(56) References Cited

U.S. PATENT DOCUMENTS

| 2,132,279 | A | * | 10/1938 | Wicknick ............... B60N 3/004 297/146 |
| 4,787,541 | A | | 11/1988 | Pollard |
| 6,135,549 | A | | 10/2000 | Demick et al. |

(Continued)

FOREIGN PATENT DOCUMENTS

| CN | 111332162 A | 6/2020 |
| DE | 102020108388 A1 | 9/2021 |

(Continued)

OTHER PUBLICATIONS

Brown, D., "Tables, footrests, smart speakers: Self-driving cars could become the living rooms of the future", USA Today, BMW, Nissan, GM: Smart car interiors to become posh living rooms, www.usatoday.com/story/money/cars, Feb. 2020 (5 pp).

(Continued)

*Primary Examiner* — Faye M Fleming
(74) *Attorney, Agent, or Firm* — Young Basile Hanlon & MacFarlane, P.C.

(57) ABSTRACT

A body structure defines a passenger cabin. An interior portion is located in the passenger cabin, and a support portion that includes a surface and an adjustable support assembly is located in the passenger cabin. The surface is located adjacent to the interior portion, the adjustable support assembly includes actuators, and the adjustable support assembly is configured to move the surface with respect to the interior portion. Sensors are configured to generate sensor outputs, and a controller detects an event based on the sensor outputs. In response to the detection of the event, the controller outputs a control signal that controls the adjustable support assembly so that the adjustable support assembly moves at least part of the surface away from the interior portion.

20 Claims, 19 Drawing Sheets

(56) References Cited

U.S. PATENT DOCUMENTS

| | | |
|---|---|---|
| 6,220,658 B1 | 4/2001 | Lukawski et al. |
| 6,547,323 B1 | 4/2003 | Aitken et al. |
| 6,565,137 B1 | 5/2003 | Snook et al. |
| 7,735,895 B2 | 6/2010 | Brown et al. |
| 8,109,565 B2 | 2/2012 | Waters et al. |
| 9,295,325 B2 | 3/2016 | Luebke et al. |
| 9,834,121 B2 | 12/2017 | Riefe |
| 10,059,296 B2 | 8/2018 | Farooq et al. |
| 10,336,275 B2 | 7/2019 | Sundararajan et al. |
| 10,814,746 B2 | 10/2020 | Sailer et al. |
| 11,091,110 B2 | 8/2021 | Takemura et al. |
| 11,225,182 B2 | 1/2022 | Lee et al. |
| 11,465,578 B1 | 10/2022 | Llamazares Domper et al. |
| 2019/0291678 A1 | 9/2019 | Cho et al. |
| 2019/0315303 A1 | 10/2019 | Kia et al. |
| 2022/0080870 A1 | 3/2022 | Park |
| 2022/0080871 A1 | 3/2022 | Park |
| 2022/0105848 A1 | 4/2022 | Otsuki |
| 2022/0105849 A1 | 4/2022 | Otsuki |
| 2022/0242323 A1 | 8/2022 | Bork et al. |
| 2022/0314858 A1 | 10/2022 | Serpis |
| 2022/0363178 A1 | 11/2022 | Mpakaris et al. |

FOREIGN PATENT DOCUMENTS

| | | |
|---|---|---|
| EP | 3819170 A1 | 5/2021 |
| JP | 2021079773 A | 5/2021 |
| JP | 2021084491 A | 6/2021 |
| WO | 2020/020504 A1 | 1/2020 |

OTHER PUBLICATIONS

McDonald, G., "Up next: self-driving offices", https://medium.com/cxo-magazine/up-next-self-driving-offices, Nov. 2017, CXO Magazine—Medium (9 pp).

Davies, C., "Six Volvo 360c features we really need in production cars", www.slashgear.com/volvo-360c-6-autonomous-ev-concept-features, Slashgear, Sep. 2018 (16 pp).

Weiss, C.C., "Panasonic's autonomous car cabin sits you at an interactive display table", https://newatlas.com/panasonic-autonomous-cabin-concept/, New Atlas, Jan. 2017 (10 pp).

* cited by examiner

MOVABLE STRUCTURES

CROSS-REFERENCE TO RELATED APPLICATIONS

This application is a continuation of U.S. application Ser. No. 17/903,352, filed on Sep. 6, 2022, which is a continuation of U.S. application Ser. No. 17/318,333, filed on May 12, 2021, which claims the benefit of U.S. Provisional Application No. 63/050,125, filed on Jul. 10, 2020, the contents of which are hereby incorporated by reference in their entirety for all purposes.

TECHNICAL FIELD

This disclosure relates generally to systems that include structures that are configured to move in response to an external event.

BACKGROUND

Known systems control passenger motion and absorb energy during an event such as a sudden abnormal change in acceleration, speed, and/or direction. Some of these systems are passive, such as safety belts, mechanical components that crush or deform to absorb energy, and spring systems that allow motion of certain components in response to applied forces. Some of these systems are active, such as air bags that deploy to react to passenger motion in a controlled manner while absorbing energy.

SUMMARY

One aspect of the disclosure is a vehicle that includes a body structure that defines a passenger cabin, a seat assembly that is located in the passenger cabin, and a table that includes a table top and an adjustable support assembly. The table top is located adjacent to the seat assembly, the adjustable support assembly includes actuators, and the adjustable support assembly is configured to move the table top with respect to the seat assembly. The vehicle also includes sensors that are configured to generate sensor outputs regarding an environment outside of the vehicle, and a controller that detects a vehicle event based on the sensor outputs. In response to the detection of the vehicle event, the controller outputs a control signal that controls the adjustable support assembly so that the adjustable support assembly moves at least part of the table top away from the seat assembly.

In some implementations of the vehicle, the controller outputs the control signal so that the adjustable support assembly moves at least part of the table top away from the seat assembly by rotating at least part of the table top away from the seat assembly.

In some implementations of the vehicle, the controller outputs the control signal so that the adjustable support assembly moves at least part of the table top away from the seat assembly by translating at least part of the table top away from the seat assembly.

In some implementations of the vehicle, the table includes a force sensor that outputs a force signal, wherein the controller outputs the control signal in dependence on the force signal.

In some implementations of the vehicle, the table includes a force sensor that outputs a force signal and the controller outputs the control signal to move at least part of the table so that a magnitude of a force represented by the force signal remains below a threshold force value.

In some implementations of the vehicle, a portion of the table top that is adjacent to the seat assembly is formed from a crushable material to absorb energy.

In some implementations of the vehicle, the adjustable support assembly includes a rotation adjuster, a first translational adjustment stage, and a second translational adjustment stage.

In some implementations of the vehicle, the adjustable support assembly includes a support column that is connected to a floor of the body structure.

In some implementations of the vehicle, the adjustable support assembly is connected to an interior wall of the body structure.

In some implementations of the vehicle, the adjustable support assembly is configured to move the table top of the table into a cavity that is defined by an interior wall of the body structure.

The vehicle may also include an airbag assembly that controllable to deploy an airbag adjacent to the seat assembly so that the airbag engages the table top and the table top serves as a reaction surface for the airbag.

Another aspect of the disclosure is a vehicle that includes a body structure that defines a passenger cabin, a seat assembly that is located in the passenger cabin, and a table that includes a table top and an adjustable support assembly. The table top is located adjacent to the seat assembly, the adjustable support assembly is configured to move the table top with respect to the seat assembly, and the adjustable support assembly is movable from a locked state in which motion of the table top is restrained to an unlocked state in which motion of the table top is allowed in at least one degree of freedom. The vehicle also includes sensors that are configured to generate sensor outputs regarding an environment outside of the vehicle, and a controller that detects a vehicle event based on the sensor outputs. In response to the detection of the vehicle event, the controller outputs a control signal to switch the adjustable support assembly from the locked state to the unlocked state.

In some implementations of the vehicle, rotation of the table top is not restrained in the unlocked state so that the table top is able to rotate in response to an external force that is applied to the table top.

In some implementations of the vehicle, translation of the table top is not restrained in the unlocked state so that the table top is able to translate in response to an external force that is applied to the table top.

In some implementations of the vehicle, a portion of the table top that is adjacent to the seat assembly is formed from a crushable material to absorb energy.

The vehicle may also include an airbag assembly that controllable to deploy an airbag adjacent to the seat assembly so that the airbag engages the table top and the table top serves as a reaction surface for the airbag.

Another aspect of the disclosure is a vehicle that includes a body structure that defines a. passenger cabin, a seat assembly that is located in the passenger cabin, and a table that includes a table top and an adjustable support assembly. The adjustable support assembly includes actuators, and the adjustable support assembly is configured to move the table top with respect to the seat assembly. The airbag assembly is controllable to deploy an airbag adjacent to the seat assembly. External sensors that are configured to generate external sensor outputs regarding an environment outside of the vehicle. A controller detects a vehicle event based on the external sensor outputs and, in response to the detection of the vehicle event, outputs a control signal that controls the adjustable support assembly so that the adjustable support assembly moves to a position where the airbag engages the table top upon deployment of the airbag so that the table top serves as a reaction surface for the airbag.

In some implementations of the vehicle, the controller outputs the control signal so that the adjustable support assembly moves at least part of the table top to a predetermined position.

The vehicle may also include internal sensors that are configured to generate internal sensor outputs regarding states within the passenger cabin, wherein the controller determines a table position based on the internal sensor outputs and outputs the control signal so that the adjustable support assembly moves at least part of the table top to the table position.

In some implementations of the vehicle, the controller outputs the control signal so that the adjustable support assembly moves at least part of the table top by rotating at least part of the table top away from the seat assembly.

In some implementations of the vehicle, the controller outputs the control signal so that the adjustable support assembly moves at least part of the table top away from the seat assembly by translating at least part of the table top away from the seat assembly.

In some implementations of the vehicle, a portion of the table top that is adjacent to the seat assembly is be formed from a crushable material to absorb energy.

DETAILED DESCRIPTION

This disclosure is directed to vehicle safety systems for use in vehicle interiors that include a table that is positionable so that it may be used by the passengers of the vehicle.

As an example, the vehicle safety systems that are described herein may be of particular applicability to fully autonomous vehicles. In such vehicles, there is no need to position a human driver near vehicle controls, allowing for various alternative passenger cabin configurations. Thus, a passenger may be seated at a table while travelling in the vehicle, instead of driving the vehicle.

The systems described herein include active and passive systems that control motion of the table upon detection of a vehicle event. As used herein, the term vehicle event refers to a collision, a crash, an evasive maneuver, or other circumstance that causes a sudden abnormal change in acceleration, speed, and/or direction of the vehicle. As used herein, detection of a vehicle event refers to detecting that a vehicle event has occurred or detecting that a vehicle event is predicted to occur (e.g., an imminent vehicle event). By controlling the motion of the table, the amount of force reacted by the table as a result of engagement by the passenger and the time period over which the force is reacted can be influenced.

Figure 1:
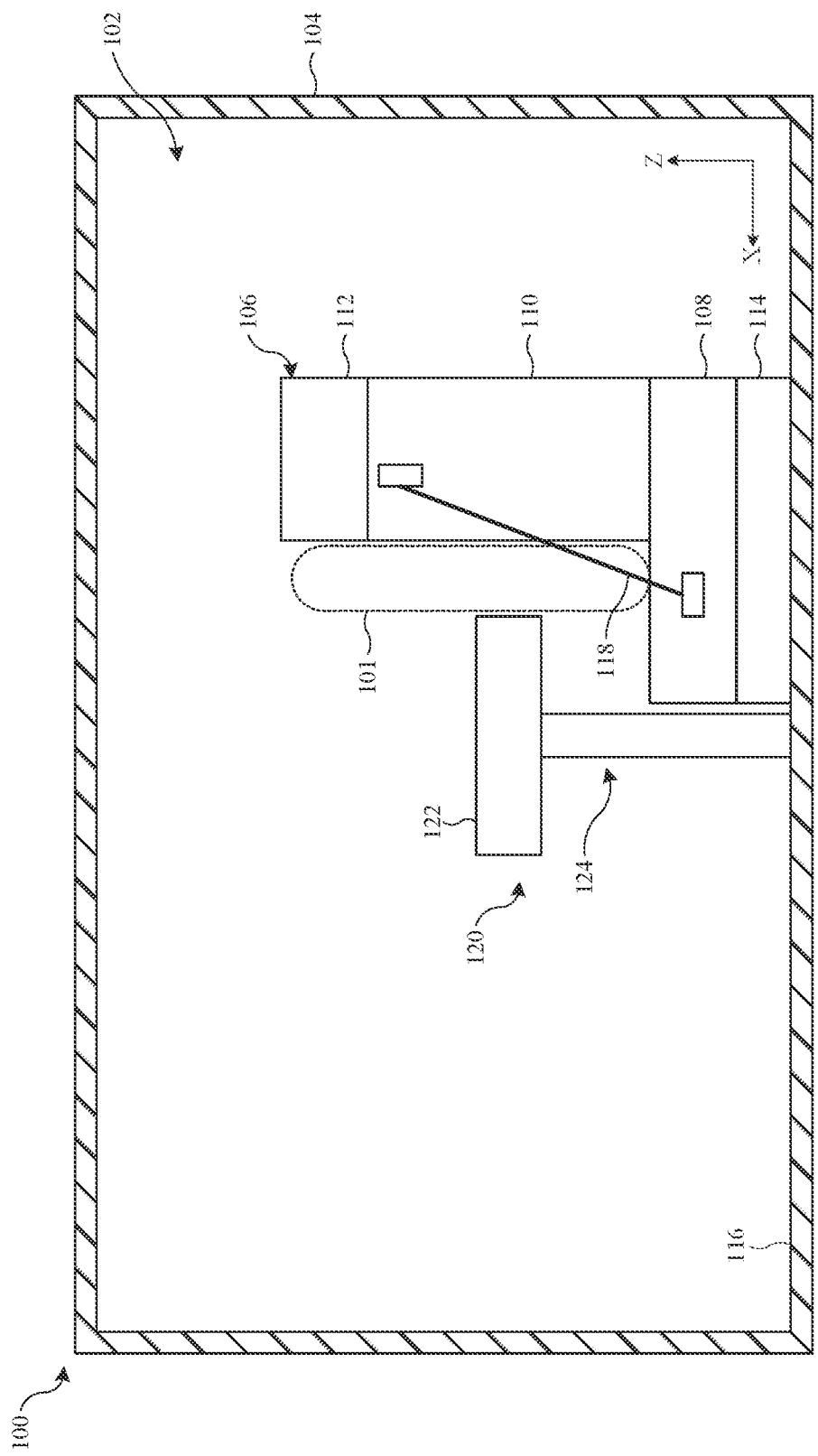
FIG. 1 is a schematic side view illustration of a vehicle that includes a passenger cabin.
Figure 2:
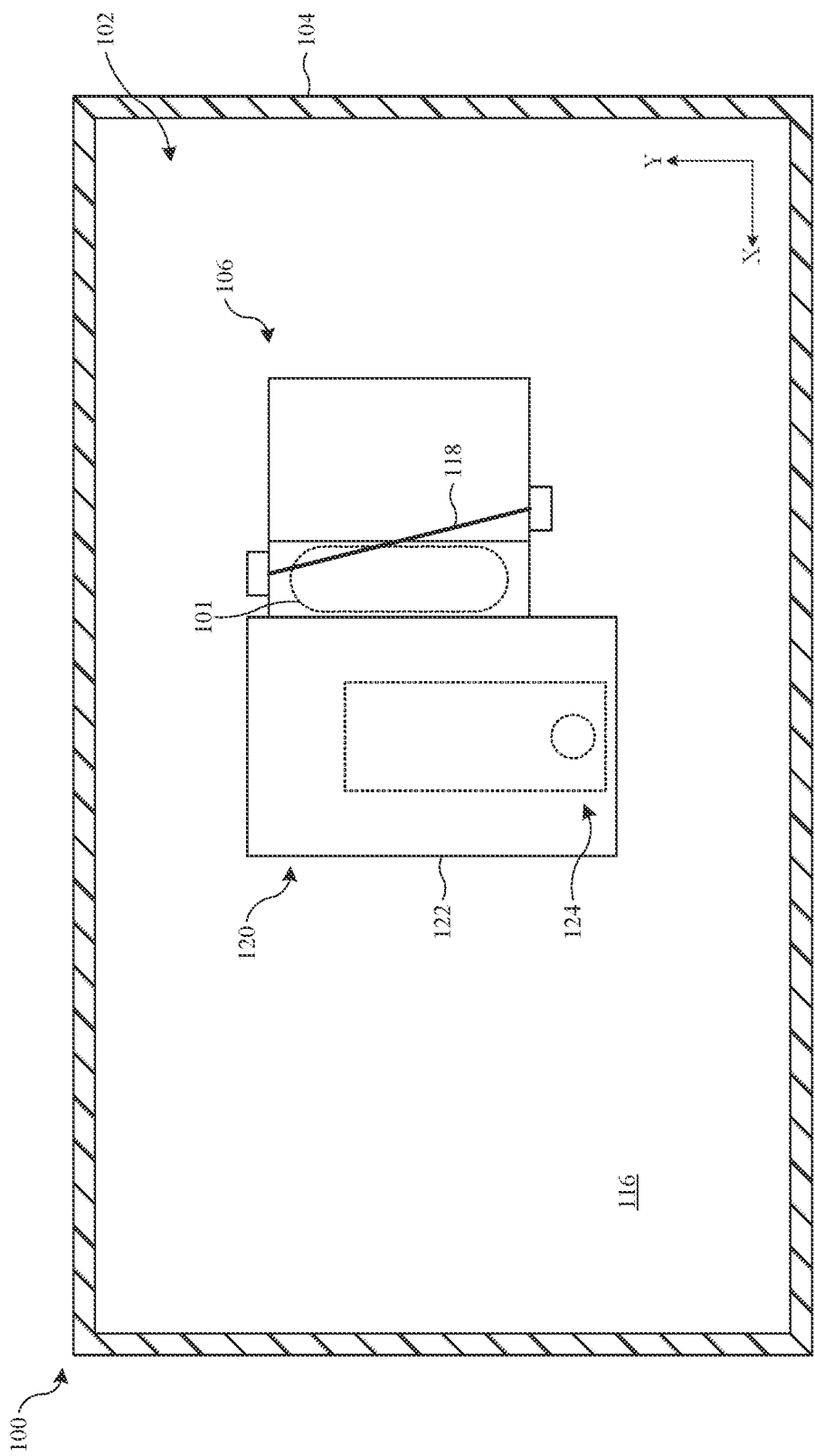
FIG. 2 is a schematic top view illustration of the vehicle.

FIG. 1 is a schematic side view illustration of a vehicle 100 that includes a passenger cabin 102 inside a body structure 104 of the vehicle 100. FIG. 2 is a schematic top view illustration of the vehicle. The vehicle 100 will be described with reference to a longitudinal direction X (e.g., fore-aft), a lateral direction Y (e.g., side to side), and an elevational direction Z (e.g., up-down).

The vehicle 100 may be a road-going vehicle that is supported by wheels and is able to travel freely upon roadways and other surfaces in accordance with a velocity, heading angle, and steering angle of the vehicle 100. The passenger cabin 102 is a space where a passenger 101 is located when travelling in the vehicle 100. The passenger cabin 102 is defined in the body structure 104 of the vehicle 100. The body structure 104 may include a frame, subframe, unibody, monocoque, exterior body panels, interior body panels, and movable panels (e.g., doors, tailgate, hood, trunk lid, etc.) that are connected to other portions of the body structure 104 by mechanisms such as hinges or tracks.

Interior elements are located in the passenger cabin 102. The interior elements include a seat assembly 106 and a table 120.

The seat assembly 106 includes a seat pan 108, a seat back 110, a head rest 112, and a seat support 114 that connects the seat assembly 106 to a floor 116 of the body structure 104. The passenger 101 may sit in the seat assembly 106. A restraint such as a seat belt 118 is provided to secure the passenger 101 with respect to the seat assembly 106. The passenger 101 should be using the seat belt 118 while the vehicle 100 is operating, as the safety systems described herein are intended to be complementary to the seat belt 118 and used in conjunction with it. It should be understood, however, that the safety systems that are described herein are configured to provide energy absorption for passengers who are not using the seat belt 118.

The seat pan 108 and the seat back 110 may each include structures such as rigid frames, springs or other resilient suspension members, cushioning materials (e.g., foam rubber), a seat cover, and/or other structures. The seat pan 108 is configured to be sat on by the user, e.g., including contact with the buttocks and thighs of the passenger 101. The seat back 110 extends upward from the seat pan 108 and may be pivotally connected to the seat back 110 to allow adjustment of a recline angle. The seat back 110 is configured for engagement with the passenger 101, e.g., with the hips, torso, shoulders, neck, and/or head of the passenger 101. The seat support 114 is connected to the seat pan 108 and/or the seat back 110 to support the remainder of the seat assembly 106 in a spaced relationship above a floor 116 of the passenger cabin 102. In some implementations, the seat support 114 may be connected to the floor 116 in a manner that allows the seat assembly 106 to be moved within the vehicle 100. As an example, the seat support 114 may be connected to the tracks that are formed in the floor 116 to allow movement of the seat assembly 106 along the tracks.

The table 120 is positioned near the seat assembly 106. In the illustrated example, the table 120 is located directly ahead (e.g. forward) of the seat assembly 106 in the longitudinal direction X of the vehicle 100. This position of the table 120 allows the table 120 to be used by the passenger 101 while they are seated in the seat assembly 106. The table 120 includes a table top 122 and an adjustable support assembly 124 that is connected to the floor 116 of the body structure 104 and supports the table top 122 so that it is located above the floor 116 so that it is accessible to the passenger 101 while the passenger 101 is seated in the seat assembly 106.

Figure 3:
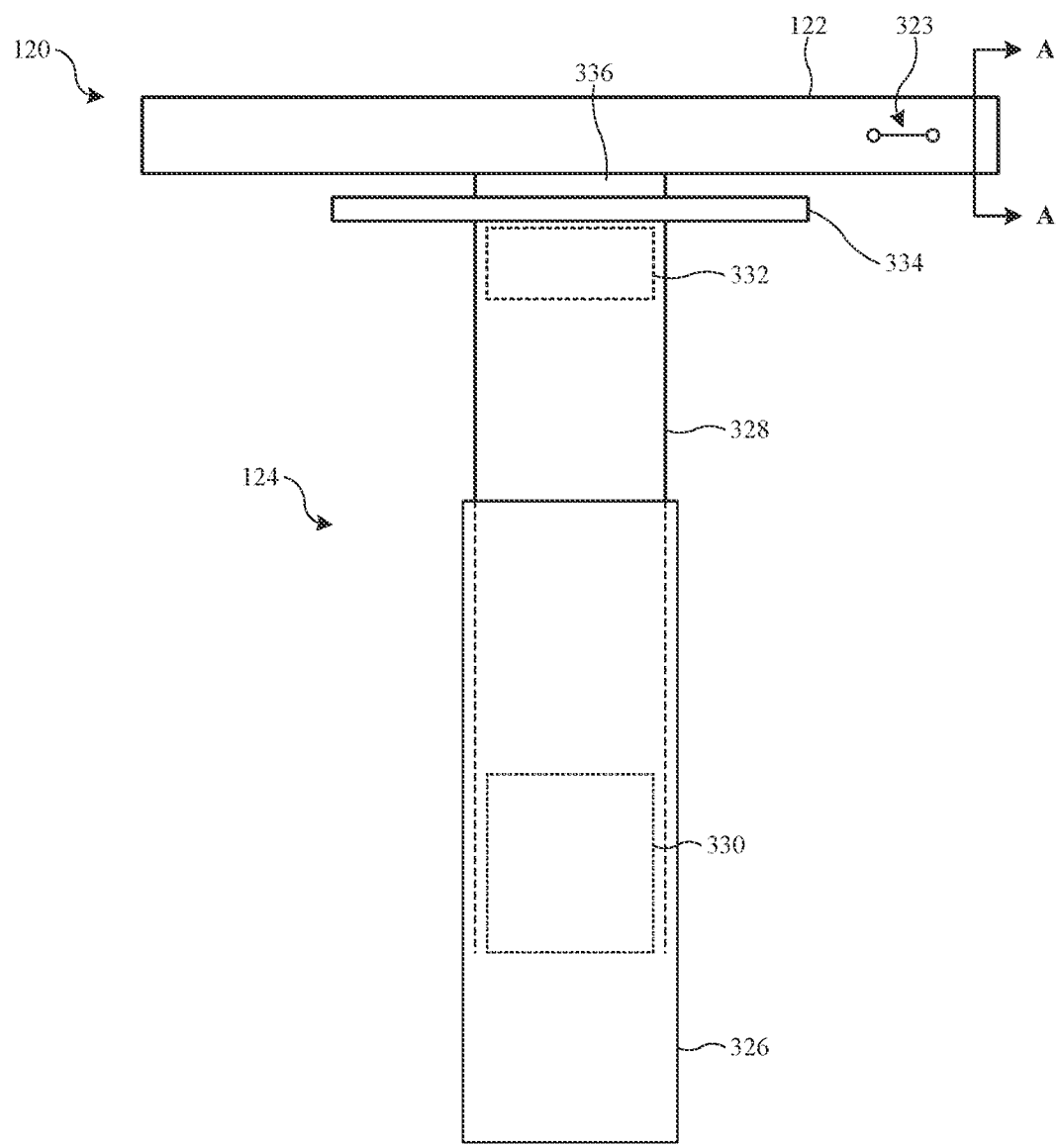
FIG. 3 is a schematic side view illustration of a table.
Figure 4:
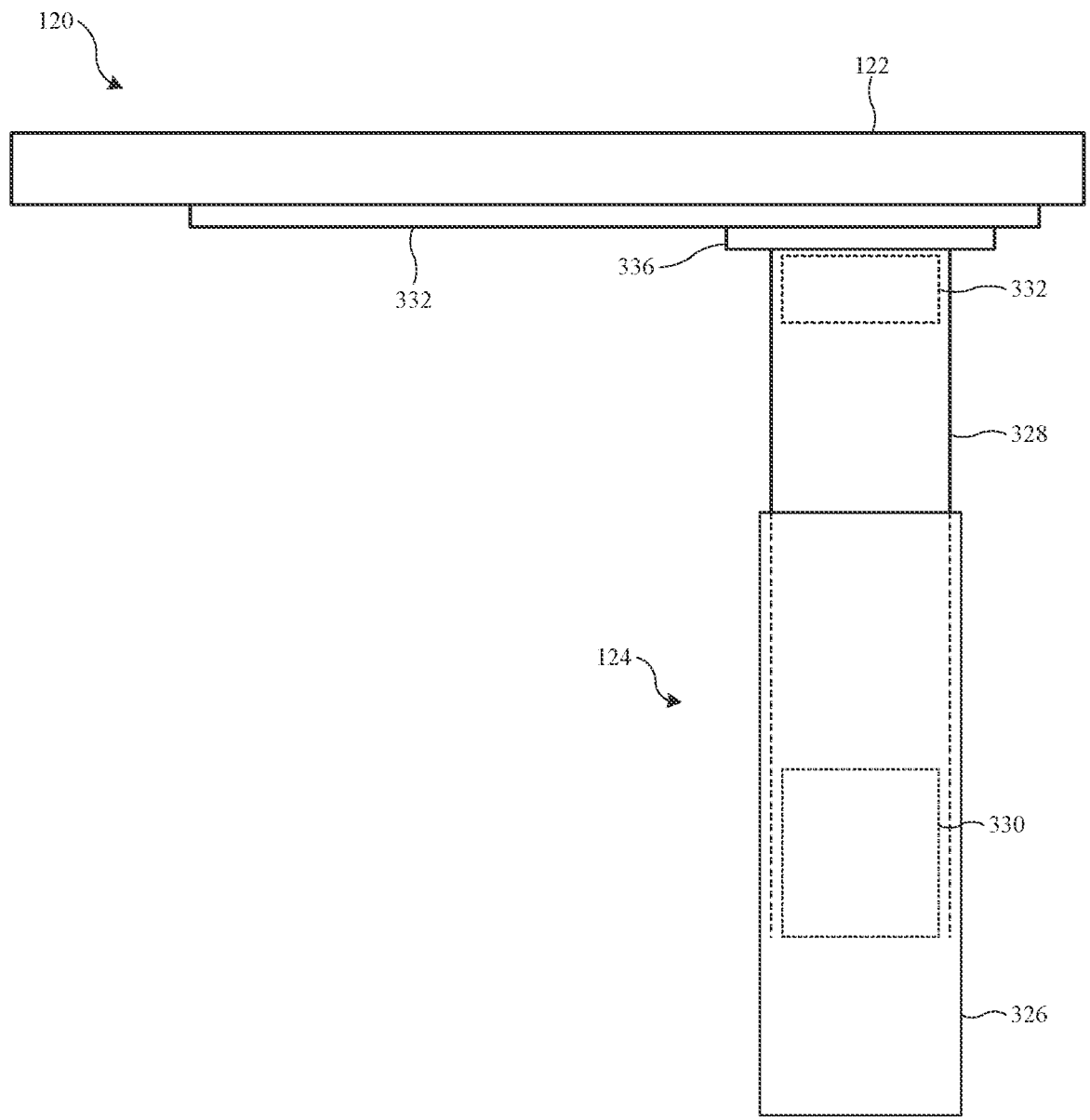
FIG. 4 is a schematic front view illustration of the table.

FIG. 3 is a schematic side view illustration of the table 120. FIG. 4 is a schematic front view illustration of the table 120. The adjustable support assembly 124 is a motorized adjustment systems that uses actuators (e.g., rotary electric motors, linear electric motors, or other actuators) to move the table top 122. The adjustable support assembly 124 is configured to adjust the position of the table top 122 of the adjustable support assembly 124 by moving the table top 122 in one or more rotational degrees of freedom and in one or more translational degrees of freedom. In the illustrated implementation, the adjustable support assembly 124 is operable to move the table top 122 in three translational degrees of freedom (e.g., corresponding to the longitudinal direction X, the lateral direction Y, and the elevational direction Z when the table top 122 is oriented as in FIGS. 1-2) and in one rotational degree of freedom (e.g., around an axis parallel to the elevational direction Z when the table top 122 is oriented as in FIGS. 1-2).

The adjustable support assembly 124 can be controlled by a passenger manual control. For example, the passenger may use an input device by which commands are input into a control system to adjust the position of the table to a comfortable position at which the table top 122 can be used for functions such as eating or using a laptop computer. The adjustable support assembly 124 can be controlled by an automated system that changes the position of the adjustable support assembly 124 according to program instructions. As an example, the automated system may move the table top 122 in response to detection of a vehicle event.

In the illustrated implementation, the adjustable support assembly 124 includes a first support column portion 326, a second support column portion 328, an elevation adjuster 330, a rotation adjuster 332, a first translational adjustment stage 334 (e.g., a longitudinal adjustment stage), and a second translational adjustment stage 336 (e.g., a lateral adjustment stage).

Adjustment components of the adjustable support assembly 124, including the elevation adjuster 330, the rotation adjuster 332, the first translational adjustment stage 334, and the second translational adjustment stage 336 may be operated in accordance with control signals that are output by a control system as will be described herein.

The first support column portion 326 and the second support column portion 328 cooperate to define a support column of the table 120. The first support column portion 326 is connected to the floor 116 of the body structure 104 of the vehicle 100. In the illustrated implementation, the first support column portion 326 and the second support column portion 328 are connecting in a telescoping manner, for example, with each including a hollow tubular structure with one of them (e.g., the second support column portion 328) having a smaller diameter to allow for nesting within the other.

The second support column portion 328 is connected to the first support column portion 326 by the elevation adjuster 330 to allow the height of the table top 122 to be raised and lowered. The elevation adjuster 330 is an actuator assembly that is configured to raise and lower the second support column portion 328 with respect to the first support column portion 326, which results in raising and lowering the table top 122. As an example, the elevation adjuster 330 may be or include a screw actuator including a rotary electric motor that is fixed to the first support column portion 326 and rotates a screw that engages a threaded element that is connected to the second support column portion 328 to cause the second support column portion 328 to raise and lower. Examples of screw actuators include lead screw actuators and ball screw actuators. The locations of components may be reversed, for example, by connecting the actuator to the second support column portion 328.

The rotation adjuster 332 is connected to the second support column portion 328 and is configured to cause rotation of the table top 122 around an uptight axis (e.g., an axis of the second support column portion 328). As an example, the rotation adjuster 332 may include a rotary electric motor that is fixed to the second support column portion 328 and has a rotatable output shaft that is connected to the first translational adjustment stage 334.

In another implementation, the rotation adjuster 332 is located in the first support column portion 326 and rotates the first support column portion 326 with respect to the floor 116 of the body structure 104. In another implementation, the rotation adjuster 332 is located in either of the first support column portion 326 or the second support column portion 328 and is configured to rotate the first support column portion 326 with respect to the second support column portion 328. In another implementation, the rotation adjuster 332 and the elevation adjuster 330 are combined to adjust elevation and rotation using a single actuator assembly.

The first translational adjustment stage 334 and the second translational adjustment stage 336 are each linear adjustment stages that allow the table top 122 to be translated in a single degree of translational freedom. The first translational adjustment stage 334 and the second translational adjustment stage 336 so that, in combination, they allow the table top 122 to be translated in a plane that extends generally perpendicular to the axis of the support column of the table 120. This may be a generally horizontal plane. The translational direction of the first translational adjustment stage 334 and the second translational adjustment stage 336 with respect to the body structure 104 of the vehicle 100 will vary according to adjustment of the rotational orientation of the table top 122 by the rotation adjuster 332.

When the table top 122 is positioned in the angular orientation that is shown in FIGS. 1-2, the first translational adjustment stage 334 is operable to move the table top 122 in the longitudinal direction X of the body structure 104 and the second translational adjustment stage 336 is operable to move the table top in the lateral direction Y of the body structure 104.

In the illustrated example, the rotation adjuster 332 is connected to the first translational adjustment stage 334, the first translational adjustment stage 334 is connected to the second translational adjustment stage 336, and the second translational adjustment stage 336 is connected to the table top 122. It should be understood that the order of these components may be changed without affecting the ability of the adjustable support assembly 124 to adjust the position of the table top 122.

In the illustrated example, the table 120 is shown as being fixed to the floor 116 of the vehicle 100. In alternative implementations, one or more of the rotation adjuster 332, the first translational adjustment stage 334, or the second translational adjustment stage 336 may be implemented as a moving connection of the table 120 to the floor 116 of the vehicle 100. As one example, the first translational adjustment stage 334 or the second translational adjustment stage may be incorporated in the floor 116 so that the table 120 translates with respect to the floor 116, for example, along a track that is defined in the floor 116. As another example, the rotation adjuster 332 may be incorporated in the floor 116 to define a rotating connection of the table 120 to the floor 116.

Figure 5:
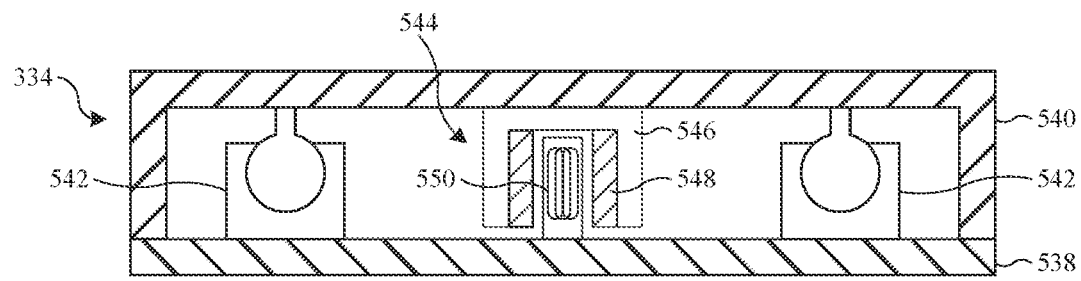
FIG. 5 is a cross-section illustration of an example implementation of the first translational adjustment stage.

FIG. 5 is a cross-section illustration of an example implementation of the first translational adjustment stage 334. The same configuration can be used to implement the second translational adjustment stage 336. In the illustrated example, the first translational adjustment stage 334 includes a carriage 538, a housing 540, linear bearings 542, and a linear electric motor 544.

The carriage 538 and the housing 540 and connected by the linear bearings 542 to allow relative sliding. As an example, the carriage 538 may have an axial length that is shorter than (e.g., one fourth of) an axial length of the housing 540. In the illustrated example, the linear bearings 542 include elongate rods that are mounted to the housing 540 and guide blocks that are mounted to the carriage 538 so that the guide blocks may slide along the elongate rods. Other configurations may be used.

The linear electric motor 544 includes a channel 546, magnet arrays 548, and electromagnetic coils 550. The channel 546 is an elongate u-shaped structure that extends along the housing 540 parallel to the linear bearings 542. The magnet arrays 548 are positioned opposite one another along the inside of the channel 546. The electromagnetic coils 550 are connected to the carriage 538 and are positioned in the channel 546 between the magnet arrays 548. As an example, the electromagnetic coils 550 may be mounted to a rigid structure that extends outward from a surface of the housing 540 into the interior of the channel 546. As is known in the art, energization and de-energization of the electromagnetic coils 550 creates attractive and repulsive forces that can be controlled to cause linear motion in a forward or rearward direction. Other actuators may be used in place of the linear electric motor 544, such as a ball screw actuator or a lead screw actuator.

It should be understood that the adjustable support assembly 124 may include passive and/or active components in various configurations. For example, the rotation adjuster 332, the first translational adjustment stage 334, or the second translational adjustment stage 336 may include passive or active movement mechanisms such as electromechanical devices, pneumatic devices, and/or pre-tensioned spring devices.

Figure 6:
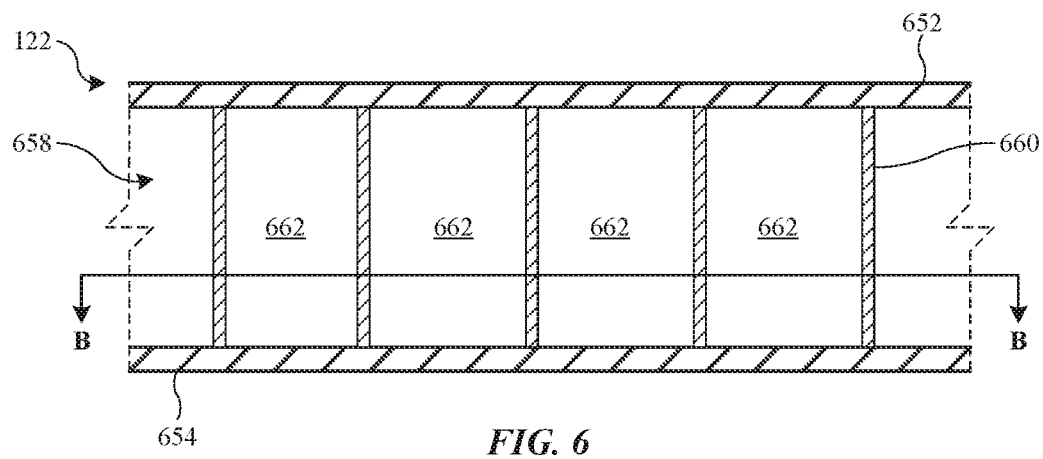
FIG. 6 is a schematic cross-section illustration of an example of an implementation a table top taken along line A-A of FIG. 3.
Figure 7:
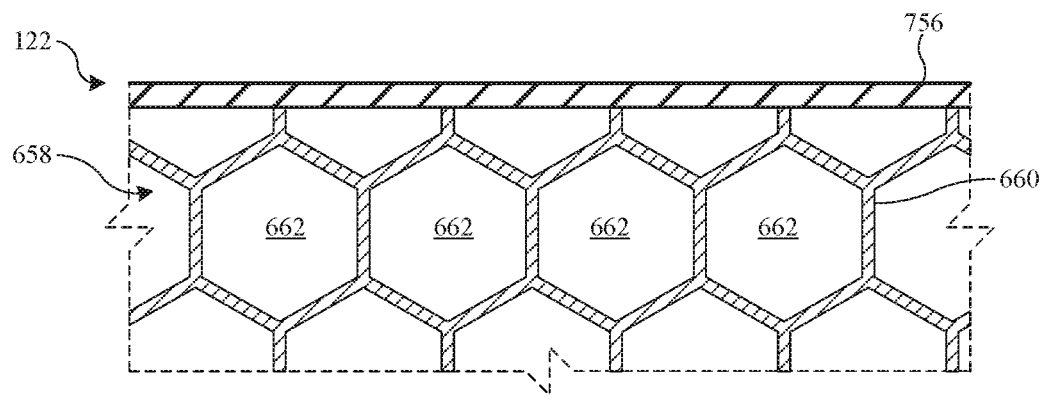
FIG. 7 is a schematic cross-section illustration of an example of an implementation the table top taken along line B-B of FIG. 6.

FIG. 6 is a schematic cross-section illustration of an example of an implementation the table top 122 taken along line A-A of FIG. 3. FIG. 7 is a schematic cross-section illustration of an example of an implementation the table top 122 taken along line B-B of FIG. 6. In the illustrated implementation, the table top 122 includes an upper panel 652, a lower panel 654, and a peripheral structure 756, at least part of the table top 122 includes an internal structure 658 that has a crushable configuration. The crushable configuration of the internal structure 658 allows the table top 122 to crush and thereby absorb energy when subjected to large external farces. As examples, the crushable configuration of the internal structure 658 may be defined by a crushable material, a geometric configuration of a rigid or semi-rigid material, or by a geometric configuration of a crushable material. Thus, a portion of the table top 122 may be formed from a crushable material to absorb energy during a vehicle event. Thus, a portion of the table top 122 that is positioned adjacent to the seat assembly 106 may be formed from a crushable material to absorb energy during a vehicle event.

In the illustrated example, the internal structure 658 includes upright wall portions 660 that extend all or part of the way between the upper panel 652 and the lower panel 654 and are arranged in a hexagonal configuration to define cells 662, which are open spaces (e.g., air spaces, pores, etc.) that extend in the elevational direction Z. The presence of the cells 662 in the internal structure 658 of the table top 122 allows for crushing, as the upright wall portions 660 may collapse toward each other during crushing. In the illustrated example, the cells 662 are configured to allow crushing in the length and width dimensions of the table top 122 but are strong in the elevational direction. This allows for crushing in response to forces applied in the longitudinal direction X and/or the lateral direction Y of the vehicle 100. Other types of cellular structures may be used instead of hexagonal configurations, including two-dimensional cellular structures and three-dimensional cellular structures of any configuration.

In some implementations, only part of the table top 122 includes an internal structure 658 that has a crushable configuration. The table top 122 may be configured so that the portion of the table top 122 that is positioned near the seat assembly 106 is crushable. For example, part of the peripheral structure 756 may be positionable adjacent to (e.g., facing) the seat assembly 106 and the crushable configuration of the internal structure 658 may be located adjacent to that part of the peripheral structure 756 and extending across the table top 122 by at least twenty percent of the width of the table top 122 in the direction perpendicular to that part of the peripheral structure 756 (e.g., at least twenty percent of a width of the table top 122 in the longitudinal direction X of the vehicle 100).

Figure 8:
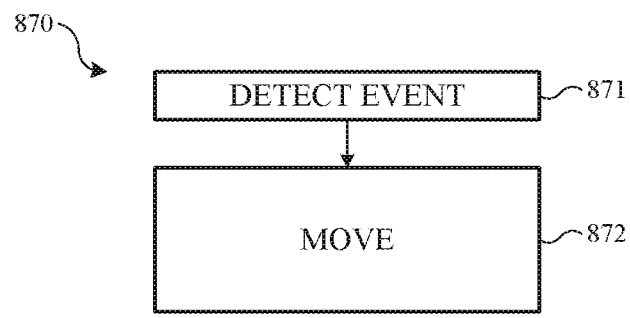
FIG. 8 is a flowchart of an example of a process for controlling a safety system of the vehicle.

FIG. 8 is a flowchart of an example of a process 870 for controlling a safety system of the vehicle 100. The process 870 may be implemented, for example, in the form of computer executable program instructions that are executed by a computing device (e.g., having a memory and a processor). The process 870 may be embodied, for example, in the form of a computer readable storage device that includes instructions that, when executed by a processor, cause the processor to perform the operations of the process 870.

In operation 871, an actual or predicted vehicle event is detected. As one example, an actual vehicle event can be detected by sensors that are associated with the vehicle 100, such as impact sensors or accelerometers. The signals from these sensors are interpreted by a control system of the vehicle (e.g., by comparing the magnitude of a sensor output sensor to a threshold value) to determine whether an actual vehicle event has occurred, such as when a sensed acceleration value exceeds a threshold value. Detection of an actual vehicle event may be performed according to known techniques. As another example, a predicted vehicle event can be detected using sensors associated with the vehicle 100 to determine the current positions of static or dynamic objects with respect to the vehicle 100, and the predict (e.g., based on current velocities of the vehicle 100 and other objects in the environment around the vehicle 100) that the vehicle 100 will collide with one or more of the static or dynamic objects (e.g., an imminent vehicle event) at a time in the future (e.g., milliseconds in the future, seconds in the future, etc.). Detection of a predicted vehicle event may be performed according to known techniques.

In operation 872, the table top 122 of the table 120 is moved using the adjustable support assembly 124. Operation 872 is performed in response to detection of an actual or predicted vehicle event in operation 871. In operation 872 the table top 122 of the table 120 may be moved away from the seat assembly 106 in order to reduce forces experienced by the passenger 101 as a result of contact with the table 120 during a vehicle event. This is an active movement of the table top 122 using actuators that are included in the adjustable support assembly 124 and under control of an automated system, for example, included in a computing device or control unit that is included in the vehicle 100.

In an implementation, the table top 122 of the table 120 is moved using the adjustable support assembly 124 in response to an actual or predicted vehicle event by translating the table top 122 away from the seat assembly 106. As a result, a distance between the seat assembly 106 and at least part of the table top 122 of the table 120 is increased. With respect to the position shown in FIGS. 1-2, the table top 122 of the passenger 101 may be translated away from the seat assembly 106 by translating the table top 122 forward in the longitudinal direction X of the vehicle 100. As an example, the table top 122 may be translated forward in the longitudinal direction X of the vehicle 100 using the first translational adjustment stage 334 of the adjustable support assembly 124 of the table 120.

In an implementation, the table top 122 of the table 120 is moved using the adjustable support assembly 124 in response to an actual or predicted vehicle event by rotating the table top 122. away from the seat assembly 106. As a result, a distance between the seat assembly 106 and at least part of the table top 122 of the table 120 is increased. With respect to the position shown in FIGS. 1-2, the table top 122 of the passenger 101 may be translated away from the seat assembly 106 by rotating the table top 122 around an axis that extends in the elevational direction Z of the vehicle 100, for example, using the rotation adjuster 332 of the adjustable support assembly 124 of the table 120.

In an implementation, the table top 122 of the table 120 is moved using the adjustable support assembly 124 in response to an actual or predicted vehicle event by translating and rotating the table top 122 away from the seat assembly 106.

In operation 872 the table top 122 of the table 120 is moved from an initial position to a changed position. The changed position reflects translation of the table top 122 of the table 120 by a distance relative to the initial position and/or rotation of the table top 122 of the table 120 by a rotation angle relative to the initial position. The distance and/or rotation angle may be a predetermined distance and/or a predetermined rotation angle. The distance and/or rotation angle may be a dynamically determined distance and/or rotation angle.

In one implementation, the table top 122 of the table 120 is moved in operation 872 dependent upon a force applied to the table top 122 by an object such as the passenger 101 or the seat assembly 106. As an example, an output signal (e.g., force signal) from a force sensor 323 (FIG. 3) can be used to determine how far to translate and/or rotate the table top 122 relative to the initial position. As one example, translation and/or rotation of the table top 122 of the table 120 may continue as while a magnitude of a force sensed by the force sensor 323 exceeds a threshold value until a maximum translation distance and/or rotation angle (e.g., predetermined maximum translation distance and predetermined maximum rotation angle) are reached. As another example, the speed and distance of translation and/or rotation of the table top 122 of the table 120 may be controlled by a predetermined relationship that controls motion of the table top 122 using a formula, lookup table or other relationship based on the magnitude of the force applied to the table 120 and optionally based on the current position of the table 120 and/or the current rotational velocity of the table 120. Thus, the table 120 may include the force sensor 323, which outputs a force signal, and a controller outputs a control signal to move the table top 122 of the table 120 using the adjustable support assembly 124 in dependence on the force signal In some implementations, translation and/or rotation of the table top 122 of the table 120 are limited to maximum values, which may be referred to as a predetermined maximum translation distance and predetermined maximum rotation angle. As one example, the actuators of the adjustable support assembly 124 may be configured to resist motion beyond the predetermined maximum translation distance and predetermined maximum rotation angle. As one example, the adjustable support assembly 124 may include mechanical stops (e.g., stop surfaces included in the rotation adjuster 332, the first translational adjustment stage 334, and/or the second translational adjustment stage 336) that are engaged to resist motion beyond the predetermined maximum translation distance and predetermined maximum rotation angle.

In some implementations of the process 870, a controller detects a vehicle event based on sensor outputs and, in response to the detection of the vehicle event, outputs a control signal that controls the adjustable support assembly so that the adjustable support assembly moves at least part of the table top away from the seat assembly. The controller may output the control signal so that the adjustable support assembly moves at least part of the table top away from the seat assembly by rotating at least part of the table top away from the seat assembly. The controller may output the control signal so that the adjustable support assembly moves at least part of the table top away from the seat assembly by translating at least part of the table top away from the seat assembly.

Figure 9:
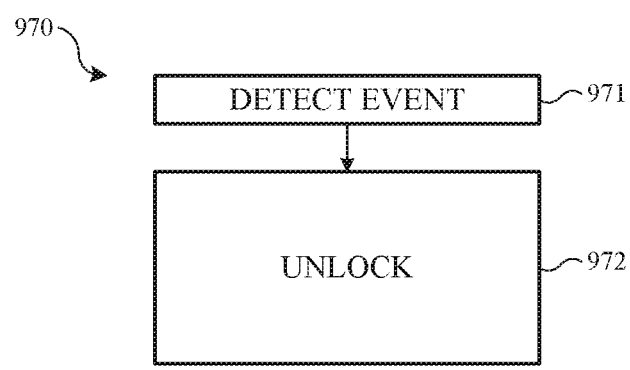
FIG. 9 is a flowchart of an example of a process for controlling a safety system of the vehicle.

FIG. 9 is a flowchart of an example of a process 970 for controlling a safety system of the vehicle 100. The process 970 may be implemented, for example, in the form of computer executable program instructions that are executed by a computing device (e.g., having a memory and a processor). The process 970 may be embodied, for example, in the form of a computer readable storage device that includes instructions that, when executed by a processor, cause the processor to perform the operations of the process 970.

Initially, the position of the table top 122 is locked so that movement of the table top 122 in rotation and translation is restrained. As one example, electric motors used in the actuators that are included in the adjustable support assembly 124 of the table 120 can apply braking according to known techniques, such as reverse current braking, to lock the movement of the table top 122. As another example, some or all of the actuators that are included in the adjustable support assembly 124 may incorporate mechanical locking structures that restrain motion of the table top 122. Mechanical locking structures may be included in, for example, the elevation adjuster 330, the rotation adjuster 332, the first translational adjustment stage 334, and/or the second translational adjustment stage 336 of the adjustable support assembly 124 of the table 120.

In operation 971, an actual or predicted vehicle event is detected in accordance with the description of operation 871 of the process 870.

In operation 972, the adjustable support assembly 124 is controlled to unlock motion of the table top 122 in at least one degree of freedom. Thus, the adjustable support assembly may be moved from a locked state to an unlocked stated in response to detection of an actual or predicted vehicle event by unlocking motion of the adjustable support assembly 124 in at least one degree of freedom so that the table top 122 is able to move passively in response to application of an external force (e.g., contact with the passenger 101). As one example, motion of the rotation adjuster 332 may be changed from a locked stated in which motion of the rotation adjuster 332 is restrained to an unlocked state in which motion of the rotation adjuster 332 is not restrained.

This is a passive movement of the table top 122 in which the table top 122 is moved by forces applied to the table top 122 by external objects as opposed to being moved by actuators that are included in the adjustable support assembly 124.

In one implementation, the table top 122 of the table 120 is moved in operation 872 dependent upon a force applied to the table top 122 by an object such as the passenger 101 or the seat assembly 106. As an example, the output signal from a force sensor 323 (FIG. 3) can be used to determine how far to translate and/or rotate the table top 122 relative to the initial position. As one example, translation and/or rotation of the table top 122 of the table 120 may continue as while a magnitude of a force sensed by the force sensor 323 exceeds a threshold value until a maximum translation distance and/or rotation angle (e.g., predetermined maximum translation distance and predetermined maximum rotation angle) are reached. As another example, translation and/or rotation of the table top 122 of the table 120 may be controlled, based the magnitude of a force sensed by the force sensor 323, to set a translational speed and/or a rotational speed that are intended to prevent the magnitude of the force sensed by the force sensor 323 from exceeding a threshold value. As another example, the speed and distance of translation and/or rotation of the table top 122 of the table 120 may be controlled by a predetermined relationship that controls motion of the table top 122 using a formula, lookup table or other relationship based on the magnitude of the force applied to the table 120 and optionally based on the current position of the table 120 and/or the current rotational velocity of the table 120.

Figure 10:
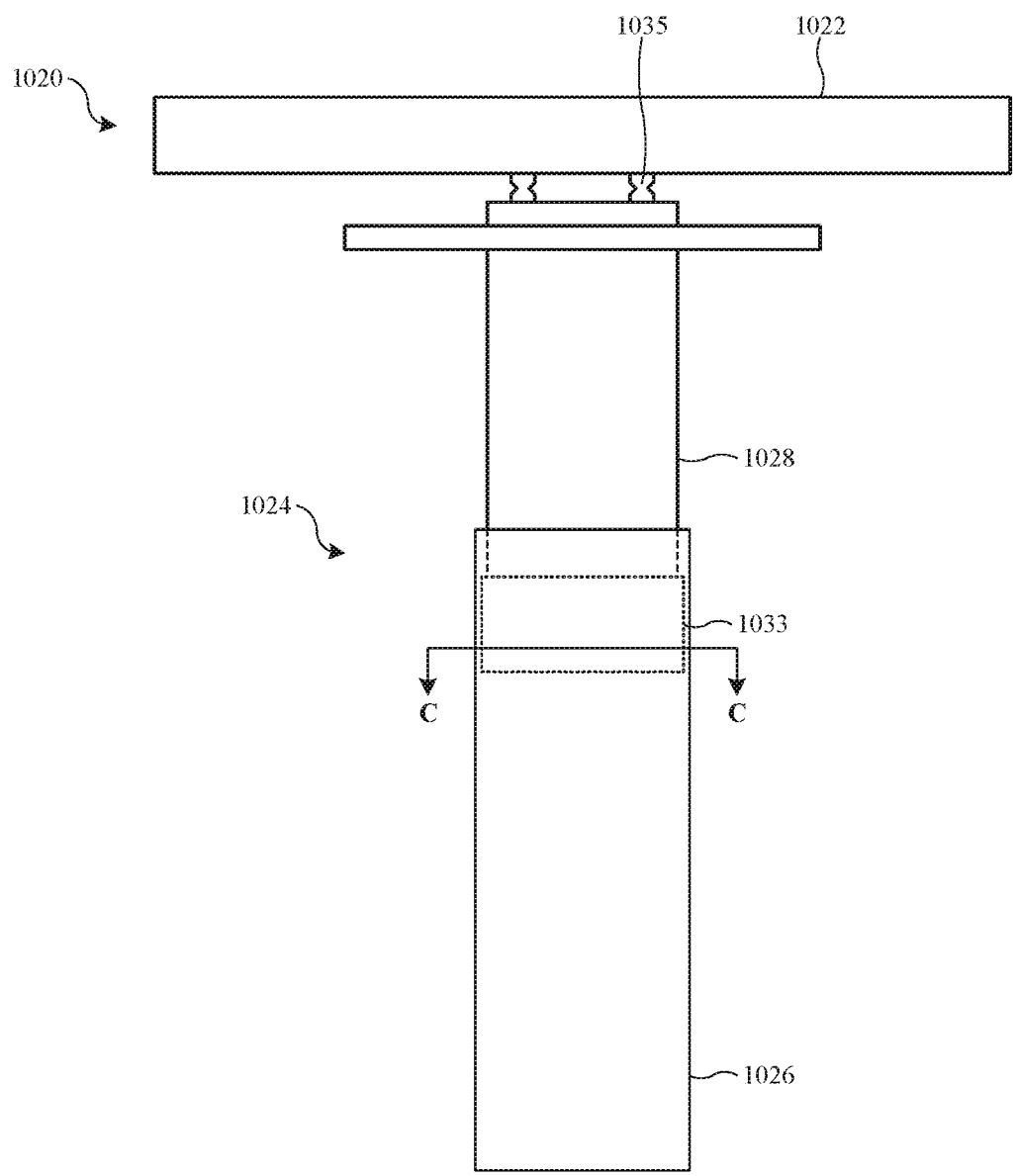
FIG. 10 is a schematic illustration that shows a table.

FIG. 10 is an illustration that shows a table 1020 that includes a table top 1022 and an adjustable support assembly 1024 that incorporates breakaway features. The table 1020 may be implemented in accordance with the description of the table 120, and the table top 1022 and the adjustable support assembly 1024 may include any or all of the components described with respect to the table top 122 and the adjustable support assembly 124. The table 1020 may be incorporated in the vehicle 100 in the manner described with respect to the table 120.

The breakaway features of the adjustable support assembly 1024 include rotational breakaway features 1033 that, in the illustrated implementation, are located at an interface of a first support column portion 1026 and a second support column portion 1028 of the adjustable support assembly 1024. The breakaway features of the adjustable support assembly 1024 also include translational breakaway features 1035 that, in the illustrated implementation, connect the table top 1022 to the adjustable support assembly 1024. The breakaway features of the adjustable support assembly 1024 may be incorporated with all other implementations of tables described herein.

Figure 11:
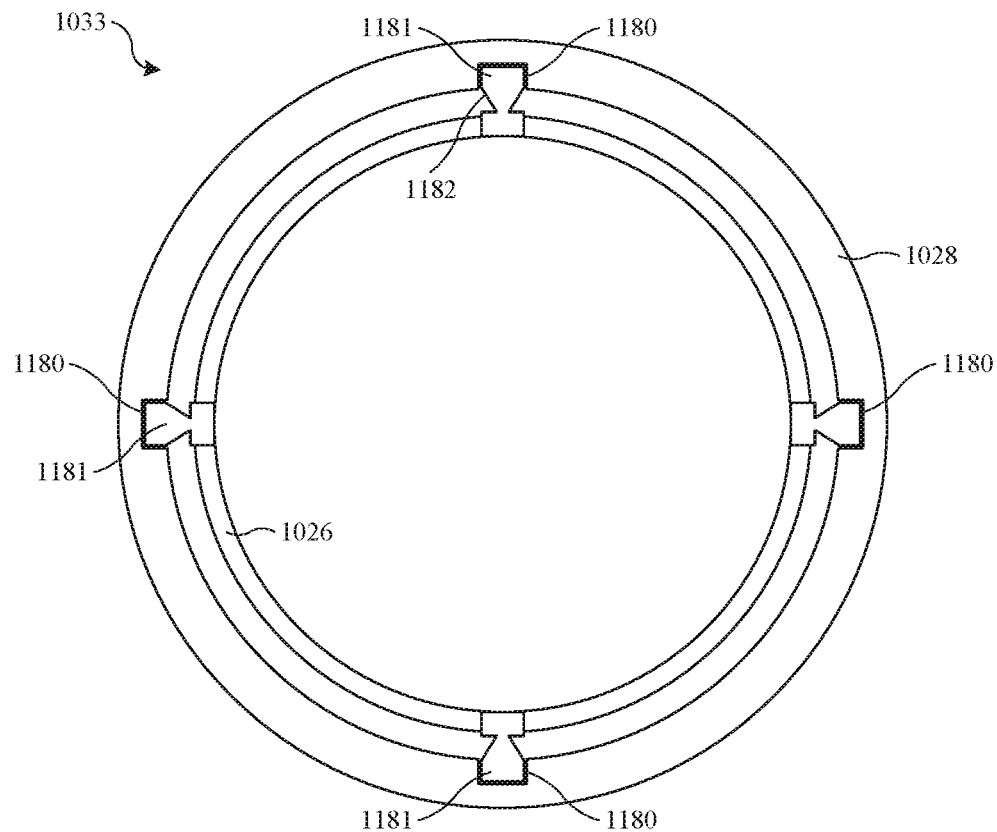
FIG. 11 is a cross-section schematic illustration taken along line C-C of FIG. 10 showing rotational breakaway features.

FIG. 11 is a cross-section illustration taken along line C-C of FIG. 10 of the rotational breakaway features 1033. In the illustrated example, the second support column portion 1028 is telescopically nested in the first support column portion 1026. The first support column portion 1026 has axial grooves 1180 formed on its inner periphery, and engaging structures such as splines 1181 extend outward from the first support column portion 1026 into the axial grooves 1180 to allow elevational translation by sliding while resisting rotation by engagement of the splines 1181 with the axial grooves 1180. The splines 1181 include axially-extending notches 1182 that define weak points that extend axially along the splines 1181. If the rotational breakaway features 1033 are subjected to a rotational force that is greater than a threshold value (e.g., according to the strength of the splines 1181 along the axially-extending notches 1182), the splines 1181 may fail (e.g., by shearing along the axially-extending notches 1182) so that the splines 1181 no longer resist rotation of the first support column portion 1026 with respect to the second support column portion 1028. This allows rotational breakaway during a vehicle event so that the table top 1022 may rotate away from the seat assembly 106.

Figure 12:
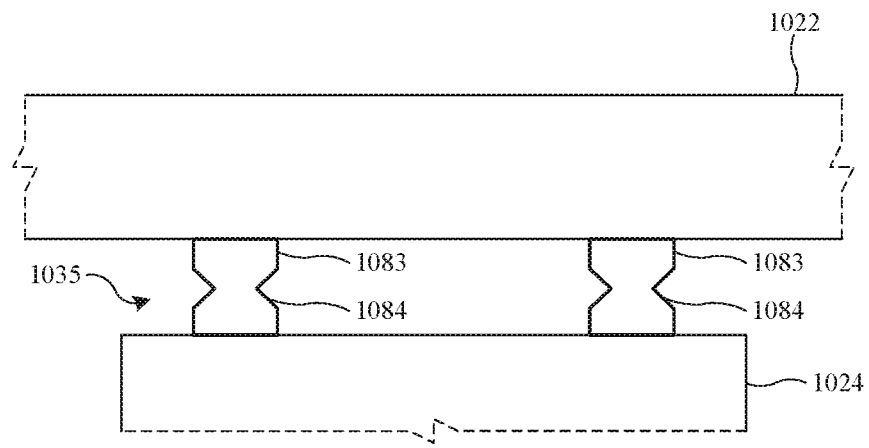
FIG. 12 is a side view schematic illustration that shows translational breakaway features.

FIG. 12 is a side view illustration that shows the translational breakaway features 1035, which include posts 1083 that connect the table top 1022 to the adjustable support assembly 1024. The posts 1083 include notches 1084 that define weak spots for the posts 1083, and are configured to fail when subjected to a force that is greater than a threshold value. As an example, the notches 1084 may be oriented to fail in response to forces applied in the longitudinal direction X of the vehicle 100 to allow translational breakaway of the table top 1022 during a vehicle event so that the table top 1022 moves translationally away (e.g., in the longitudinal direction X) during a vehicle event.

Figure 13:
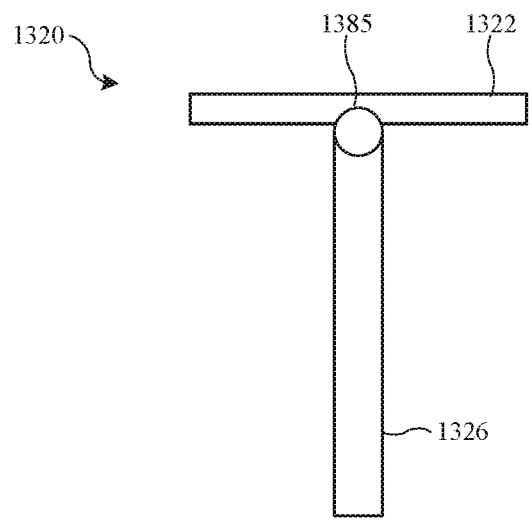
FIG. 13 is a schematic illustration that shows a table in a first position.
Figure 14:
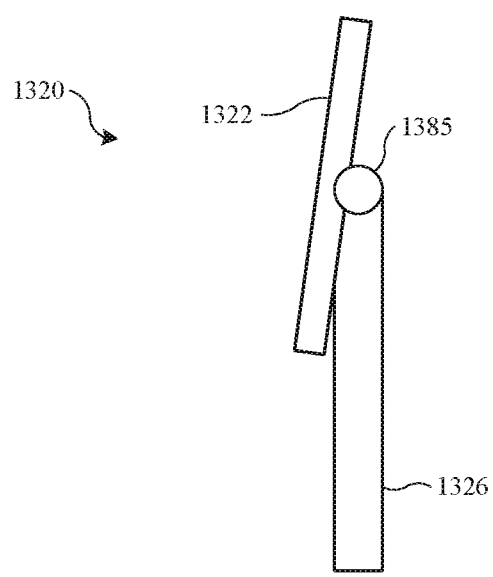
FIG. 14 is a schematic illustration that shows the table of FIG. 12 in a second position.

FIG. 13 is an illustration that shows a table 1320 in a first position in which a table top 1322 is oriented such that the upper surface of the table top 1322 is generally horizontal. The position shown in FIG. 13 is a use position that corresponds to usage of the table 1320 under normal circumstances. FIG. 14 is an illustration that shows the table 1320 in a second position in which the table top 1322 is oriented so that the upper surface of the table top 1322 is generally upright (e.g., within twenty-five degrees of vertical). The table 1320 may be implemented in accordance with the description of the table 120, and may include any or all of the components described with respect to the table 120, including the adjustable support assembly 124. The table 1320 may be incorporated in the vehicle 100 in the manner described with respect to the table 120.

The table top 1322 is connected to a support column 1326 by a pivot assembly 1385. A rotation axis of the pivot assembly 1385 may be generally horizontal. For example, as installed in the vehicle 100, the rotation axis of the pivot assembly 1385 may extend parallel to the lateral direction Y of the vehicle 100. The pivot assembly 1385 may be active or passive. As one example, the pivot assembly 1385 may be controlled actively according to the process 870. As another example, the pivot assembly 1385 may be controlled passively according to the process 970.

In one implementation, the pivot assembly 1385 is active and includes an actuator (e.g. a rotary electric motor) that can be controlled to pivot the table top 1322 from the first position to the second position in response to detection of an actual or predicted vehicle event. In another implementation, the pivot assembly 1385 includes a release mechanism (e.g., solenoid pin) that resists rotation while locked, allows rotation when released, and is released (e.g., by a signal or command) in response to detection of an actual or predicted vehicle event. In this implementation, the table top 1322 may be off-balance relative to the pivot assembly 1385 and/or the pivot assembly 1385 may be spring biased to cause pivoting of the table top 1322 from the first position to the second position when the pivot assembly 1385 is released. In another implementation, the pivot assembly 1385 may include rotational breakaway features (e.g., implemented per the rotational breakaway features 1033) that allow pivoting of the table top 1322 from the first position to the second position in response to an applied force that causes the rotational breakaway features to fail (e.g., force greater than a threshold values corresponding to the strength of the rotational breakaway features.

Figure 15:
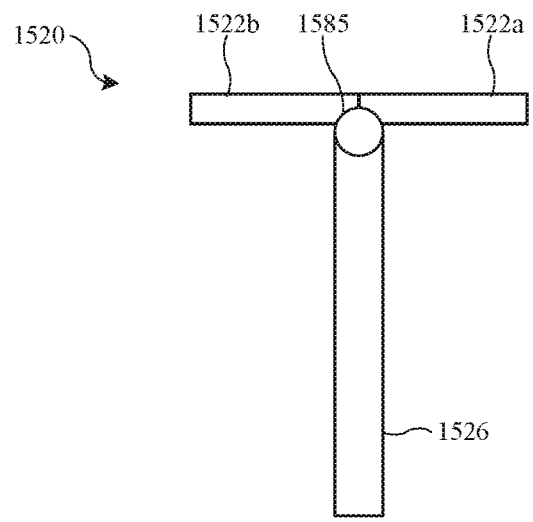
FIG. 15 is a schematic illustration that shows a table in a first position.
Figure 16:
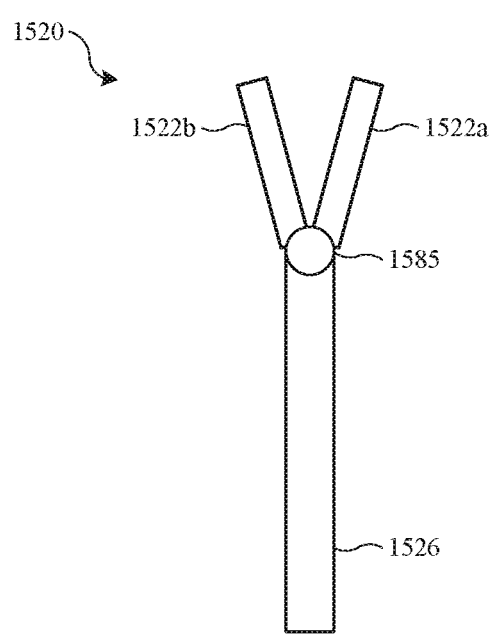
FIG. 16 is a schematic illustration that shows the table of FIG. 15 in a second position.

FIG. 15 is an illustration that shows a table 1520 in a first position in which a table top having a first table top portion 1522a and a second table top portion 1522b is oriented such that the upper surface of the table top is generally horizontal. The position shown in FIG. 15 is a use position that corresponds to usage of the table 1520 under normal circumstances. FIG. 16 is an illustration that shows the table 1520 in a second position in which the first table top portion 1522a and the second table top portion 1522b are each oriented so that the upper surface of the table top is generally upright (e.g., within twenty-five degrees of vertical). The table 1520 may be implemented in accordance with the description of the table 120, and may include any or all of the components described with respect to the table 120, including the adjustable support assembly 124. The table 1520 may be incorporated in the vehicle 100 in the manner described with respect to the table 120.

The first table top portion 1522a and the second table top portion 1522b are connected to a support column 1526 by a pivot assembly 1585. A rotation axis (or rotation axes) of the pivot assembly 1585 may be generally horizontal. For example, as installed in the vehicle 100, the rotation axis of the pivot assembly 1585 may extend parallel to the lateral direction Y of the vehicle 100. The pivot assembly 1585 allows independent pivoting of the first table top portion 1522a and the second table top portion 1522b. In the illustrated implementation, the first table top portion 1522a and the second table top portion 1522b each pivot upward independently from the first position to the second position. In an alternative implementation, the first table top portion 1522a and the second table top portion 1522b each pivot downward independently from the first position to the second position. The first table top portion 1522a and the second table top portion 1522b may move passively or actively, for example, according to the implementations discussed in connection with the table top 1322 of the table 1320. For example, the table 1520 may include electromechanical actuators to move the first table top portion 1522a and the second table top portion 1522b upward or downward. As one example, the pivot assembly 1585 may be controlled actively according to the process 870. As another example, the pivot assembly 1585 may be controlled passively according to the process 970. When rotated upward or downward, surfaces of the first table top portion 1522a and the second table top portion 1522b may be oriented generally vertically, such as generally perpendicular to the longitudinal direction X.

Figure 17:
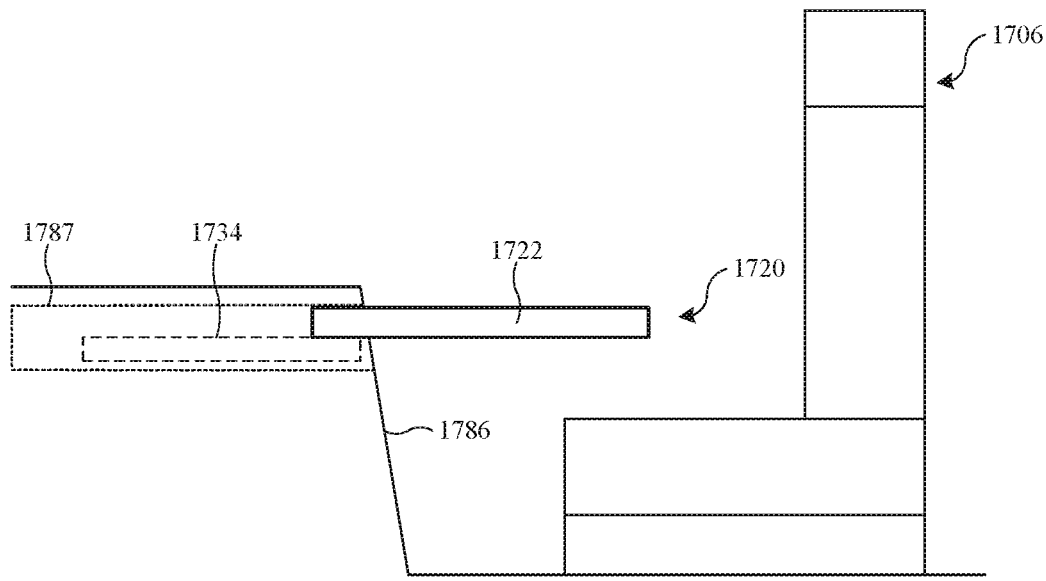
FIG. 17 is a schematic illustration that shows a table in a deployed position.
Figure 18:
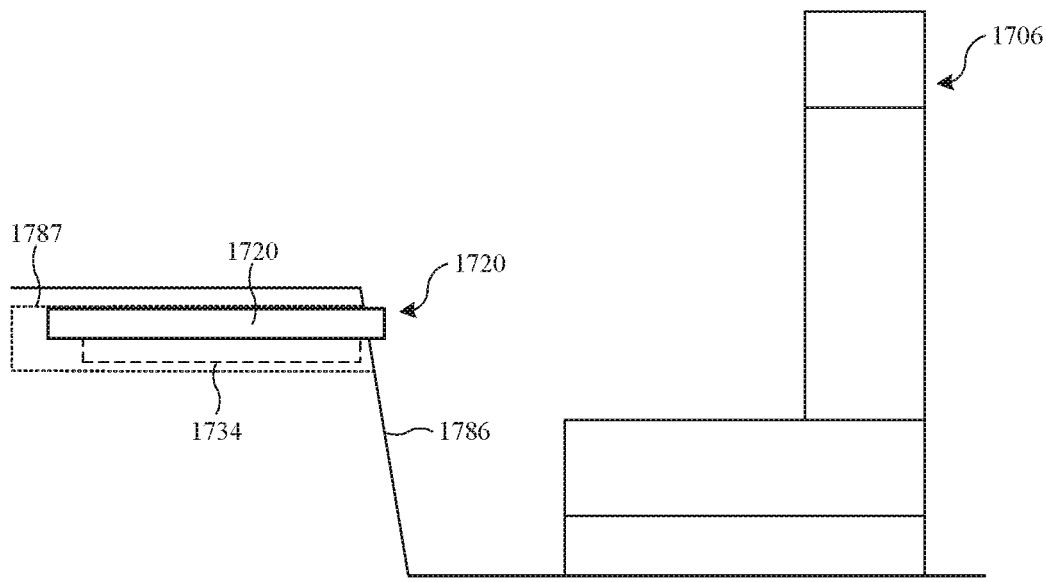
FIG. 18 is a schematic illustration that shows the table of FIG. 17 in a retracted position.

FIG. 17 is an illustration that shows a table 1720 in a deployed position. FIG. 18 is an illustration that shows the table 1720 in a retracted position. The table 1720 includes a table top 1722 is connected to and supported by an interior wall 1786 (e.g., instrument panel, etc.) that is located in a passenger cabin of a vehicle, such as the passenger cabin 102 of the vehicle 100. For example, the interior wall 1786 may be part of the body structure 104 of the vehicle 100. In the deployed position, the table top 1722 may be located near a seat assembly 1706 that is similar to the seat assembly 106. The table top 1722 may move to the retracted position by sliding from the deployed position into a cavity 1787 that is formed in the interior wall 1786 (e.g., through an opening formed in the interior wall 1786). In the deployed position, a majority of the table top 1722 is located outside of the cavity 1787. In the retracted position, a majority of the table top 1722 is located in the cavity 1787.

The table top 1722 may be supported by a translational stage 1734 that allows the table top 1722 to slide between the deployed position and the retracted position. The translational stage 1734 may be active or passive. In active implementations, the translational stage 1734 may include actuators (e.g., electromechanical actuator devices) that move the table top 1722 from the deployed position to the retracted in response to a command that is issued by a control system in response to detection of a vehicle event. In passive implementations, the table top 1722 may move from the deployed position to the retracted position in response to application of force to the table top 1722 (e.g., upon contact of the passenger 101 with the table 1720 during a vehicle event). As one example, motion of the table top 1722 may be controlled actively according to the process 870. As another example, motion of the table top 1722 may be controlled passively according to the process 970.

The translational stage 1734 may be or include an electromechanical device, a pneumatic device and/or a pre-tensioned spring device. The translational stage 1734 may be implemented in the manner described with respect to the first translational adjustment stage 334 and the second translational adjustment stage 336. The translational stage 1734 may include an energy absorbing device that controls motion of the table top 1722 to absorb energy in a controlled manner during movement of the table top 1722 in response to force applied by contact of the passenger 101 with the table top 1722.

Figure 19:
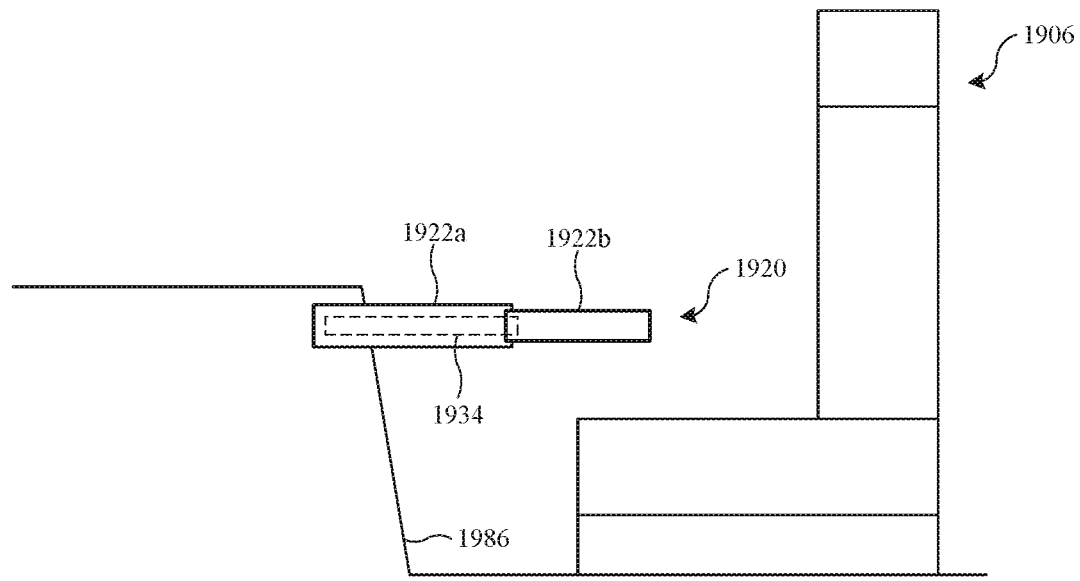
FIG. 19 is a schematic illustration that shows a table in a deployed position.
Figure 20:
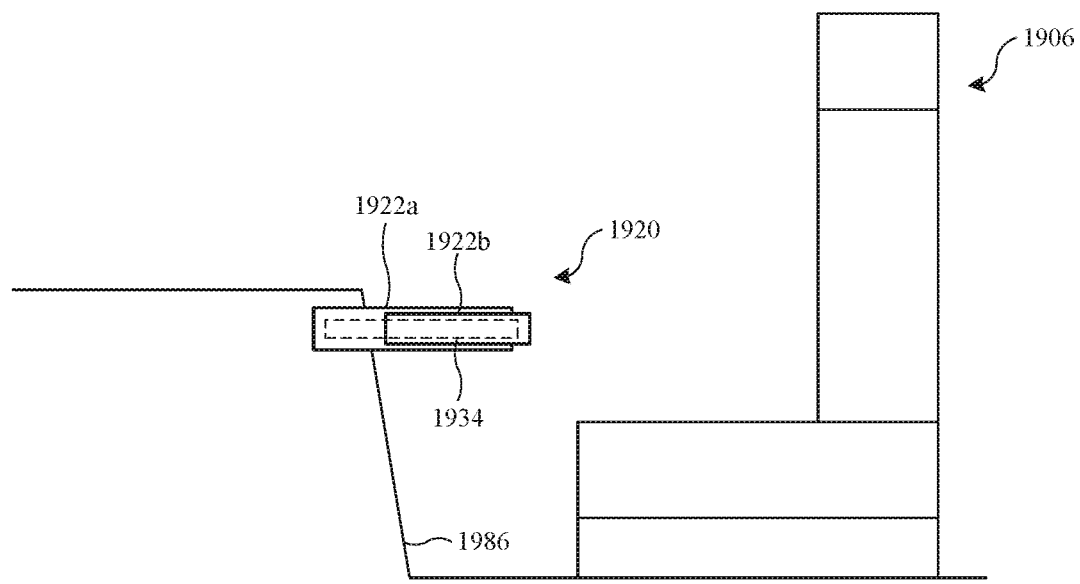
FIG. 20 is a schematic illustration that shows the table of FIG. 19 in a retracted position.

FIG. 19 is an illustration that shows a table 1920 in a deployed position. FIG. 20 is an illustration that shows the table 1920 in a retracted position. The table 1920 includes a table top having a first table top portion 1922a and a second table top portion 1922b. The first table top portion 1922a is connected to and supported by an interior wall 1986 (e.g., instrument panel, etc.) that is located in a passenger cabin of a vehicle, such as the passenger cabin 102 of the vehicle 100. The second table top portion 1922b is telescopically related to the first table top portion 1922a so that it slides into and out of an interior of the first table top portion 1922a between the deployed position and the retracted position. In the deployed position, the second table top portion 1922b may be located near a seat assembly 1906 that is similar to the seat assembly 106. The second table top portion 1922b may move to the retracted position by sliding from the deployed position into the interior of the first table top portion 1922a. In the deployed position, a majority of the second table top portion 1922b is located outside of the first table top portion 1922a. In the retracted position, a majority of the second table top portion 1922b is located in the interior of the first table top portion 1922a.

The second table top portion 1922b may be supported by a translational stage 1934 that allows the second table top portion 1922b to slide between the deployed position and the retracted position. The translational stage 1934 may be active or passive. In active implementations, the translational stage 1934 may include actuators (e.g., electromechanical actuator devices) that move the second table top portion 1922b from the deployed position to the retracted in response to a command that is issued by a control system in response to detection of a vehicle event. In passive implementations, the second table top portion 1922b may move from the deployed position to the retracted position in response to application of force to the second table top portion 1922b (e.g., upon contact of the passenger 101 with the second table top portion 1922b during a vehicle event). As one example, motion of the second table top portion 1922b may be controlled actively according to the process 870. As another example, motion of the second table top portion 1922b may be controlled passively according to the process 970.

The translational stage 1934 may be or include an electromechanical device, a pneumatic device and/or a pre-tensioned spring device. The translational stage 1934 may be implemented in the manner described with respect to the first translational adjustment stage 334 and the second translational adjustment stage 336. The translational stage 1934 may include an energy absorbing device that controls motion of the second table top portion 1922b to absorb energy in a controlled manner during movement of the second table top portion 1922b in response to force applied by contact of the passenger 101 with the second table top portion 1922b.

Figure 21:
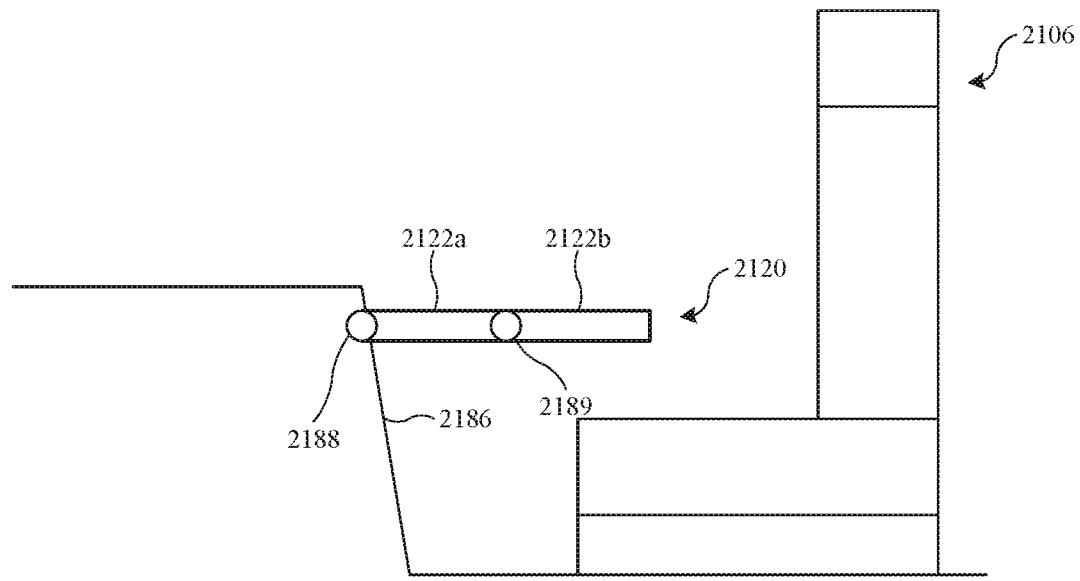
FIG. 21 is a schematic illustration that shows a table in a deployed position.
Figure 22:
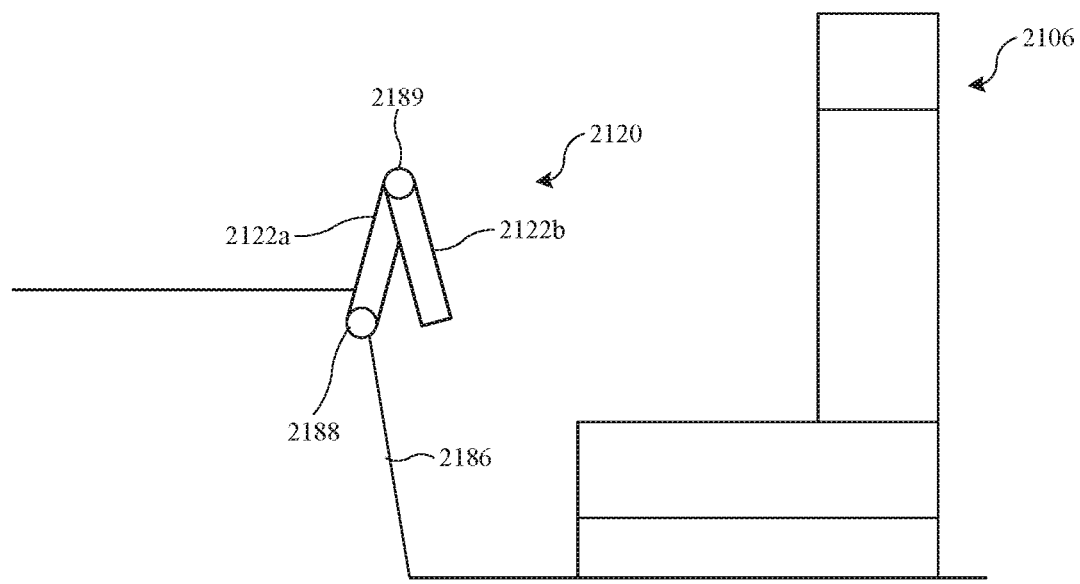
FIG. 22 is a schematic illustration that shows the table of FIG. 21 in a retracted position.

FIG. 21 is an illustration that shows a table 2120 in a deployed position. FIG. 22 is an illustration that shows the table 2120 in a retracted position. The table 2120 includes a table top having a first table top portion 2122a and a second table top portion 2122b. The first table top portion 2122a is connected to and supported by an interior wall 2186 (e.g., instrument panel, etc.) that is located in a passenger cabin of a vehicle, such as the passenger cabin 102 of the vehicle 100. The table 2120 includes an adjustable support assembly that is defined by a first pivot assembly 2188 and a second pivot assembly 2189. The first pivot assembly 2188 connects the first table top portion 2122a to the interior wall 2186 so that the first table top portion 2122a is rotatable with respect to the interior wall 2186. The second table top portion 2122b is connected to the first table top portion 2122a by a second pivot assembly 2189 so that the second table top portion 2122b is rotatable with respect to the first table top portion 2122a. In the deployed position, the second table top portion 2122b may be located near a seat assembly 2106 that is similar to the seat assembly 106 and the first table top portion 2122a and the second table top portion 2122b are arranged so that they are oriented generally horizontally and in a generally coplanar relationship with respect to each other.

To move from the extended position to the retracted position, the first pivot assembly 2188 causes (e.g., actively) or permits (e.g., passively) rotation of the first table top portion 2122a relative to the interior wall 2186 so that it extends generally upward from the interior wall 2186 at the second pivot assembly 2189, while the second pivot assembly 2189 causes or permits rotation of the second table top portion 2122b relative to the first table top portion 2122a so that it extends generally downward from the first table top portion 2122a at the second pivot assembly 2189.

The first pivot assembly 2188 and the second pivot assembly 2189 are pivoting hinge type assemblies that may be active or passive. In active implementations, the first pivot assembly 2188 and the second pivot assembly 2189 may include actuators (e.g., electromechanical actuator devices) that move the first table top portion 2122a and the second table top portion 2122b from the deployed position to the retracted in response to a command that is issued by a control system in response to detection of a vehicle event. In passive implementations, the first table top portion 2122a and the second table top portion 2122b may move from the deployed position to the retracted position in response to application of force to the second table top portion 2122b (e.g., upon contact of the passenger 101 with the second table top portion 2122b during a vehicle event). As one example, motion of the first table top portion 2122a and the second table top portion 2122b may be controlled actively according to the process 870. As another example, motion of the first table top portion 2122a and the second table top portion 2122b may be controlled passively according to the process 970.

The first pivot assembly 2188 and the second pivot assembly 2189 may each be or include an electromechanical device, a pneumatic device and/or a pre-tensioned spring device. The first pivot assembly 2188 and the second pivot assembly 2189 may be implemented in the manner described with respect to the rotation adjuster 332, the pivot assembly 1385 and/or the pivot assembly 1585. The first pivot assembly 2188 and the second pivot assembly 2189 may each include an energy absorbing device that controls motion of the first table top portion 2122a and the second table top portion 2122b to absorb energy in a controlled manner during movement of the second table top portion 2122b in response to force applied by contact of the passenger 101 with the second table top portion 2122b.

Figure 23:
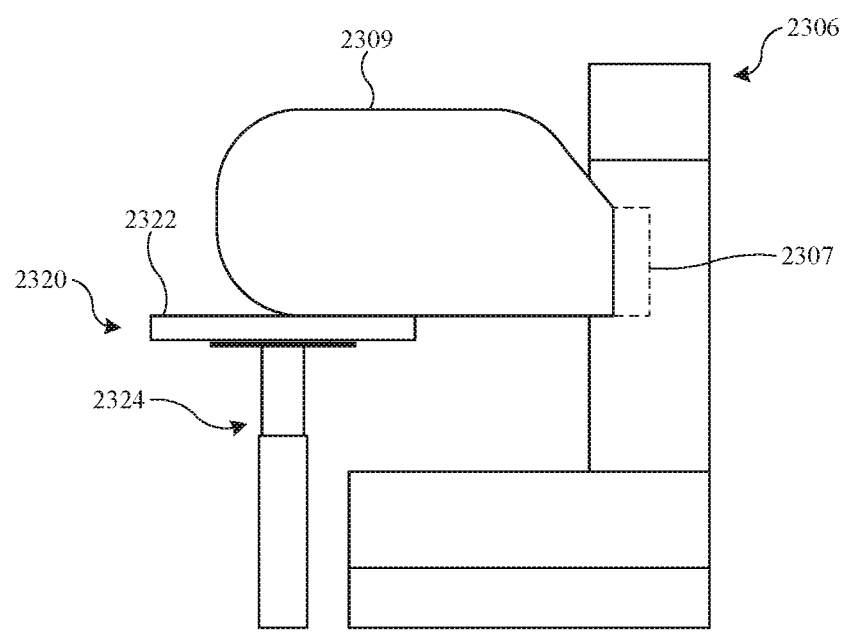
FIG. 23 is a side view schematic illustration that shows a seat assembly and a table.

FIG. 23 is a side view schematic illustration that shows a seat assembly 2306 and a table 2320. The seat assembly 2306 may be implemented according to the description of the seat assembly 106. The table 2320 may be implemented according to the description of tables in any of the foregoing implementations, including the table 120. The seat assembly 2306 and the table 2320 may be located in the passenger cabin of a vehicle, such as the passenger cabin 102 of the vehicle 100.

The table 2320 includes an adjustable support assembly 2324, which is implemented in accordance with the description of the adjustable support assembly 124 or in accordance with the descriptions of any of the mechanisms described in the foregoing embodiments alone or in combination.

An airbag assembly 2307 is located adjacent to the seat. In the illustrated implementation, the airbag assembly 2307 is located in the seat assembly 2306. As examples, the airbag assembly 2307 could be located along the sides of the seat pan, seat back, or headrest of the seat assembly, or in arms of the seat assembly 2306. In other implementations, the airbag assembly 2307 may be located in or under the table, in the ceiling of the passenger cabin, or in the side walls of the passenger cabin. The airbag assembly, prior to deployment, includes a folded airbag and an inflator (e.g., pyrotechnic). Other components may be included. When inflated, the airbag assembly 2307 defines an inflated airbag 2309 that is located in front of a passenger that is seated in the seat assembly 2306. The table 2320 serves as a reaction surface that restricts movement of the inflated airbag 2309 so that it is able to react the forces applied to it as a result of engagement by the passenger, for example, by engagement of the inflated airbag 2309 with a top surface of a table top 2322 of the table 2320. Thus, the safety systems that are described herein may include an airbag assembly that is controllable to deploy an airbag adjacent to the seat assembly so that the airbag engages the table top and the table top serves as a reaction surface for the airbag.

To allow the table 2320 to serve as a reaction surface, the adjustable support assembly 2324 may be controlled in response to detection of a vehicle event to move the table 2320 to a location where it will effectively react the inflated airbag 2309. As one example, the adjustable support assembly 2324 may be controlled (e.g., by a controller) to move the table 2320 to a predetermined position. As another example, the controller may determine a table position for the table 2320 based on sensor output signals that are received from sensors and then move the table 2320 to the determined table position. The sensor output signals may represent one or more internal or external factors. External factors may include sensed values relating to an actual or predicted vehicle event such as a speed of the vehicle 100, a speed of an external vehicle, and the location of the external. Internal factors may include sensed values relating to the passenger, such as measurements of the passenger (e.g., weight and height) and the relative positions of the seat assembly 2306 and the table 2320. Thus, in some implementations, a controller outputs a control signal so that the adjustable support assembly 2324 moves at least part of the table top 2322 to a predetermined position. In some implementations, internal sensors are configured to generate internal sensor outputs regarding states within the passenger cabin, and a controller determines a table position based on the internal sensor outputs and outputs the control signal so that the adjustable support assembly 2324 moves at least part of the table top 2322 to the table position.

FIGS. 24-27 are directed to examples of energy absorbing devices that may be used with described herein as passive motion control devices to absorb energy in a controlled manner. As an example, the example energy absorbing devices may be used in translational stages discussed herein, such as the translational stage 1734 and the translational stage 1934. The energy absorbing devices can be used to control or dampen movement of any of the tables, table tops, and components thereof during a vehicle event or other rapid deceleration of the vehicle 100.

Figure 24:
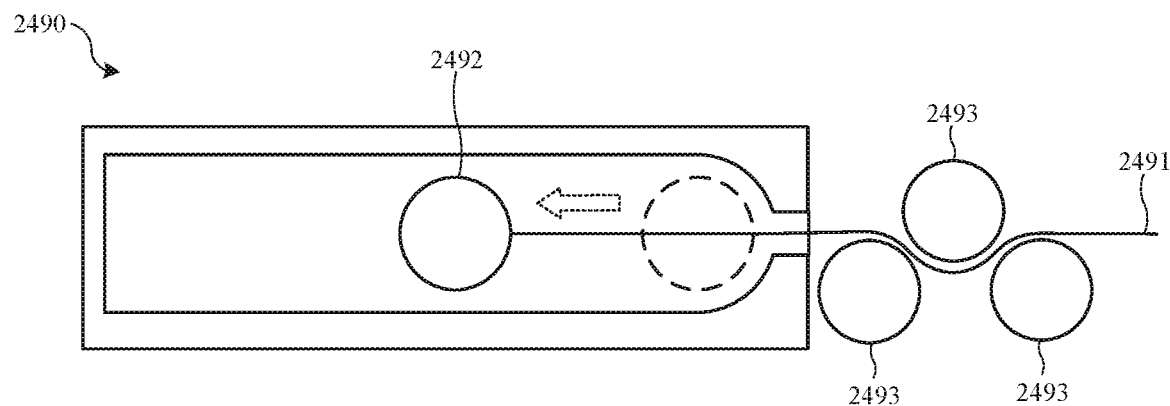
FIG. 24 shows a motion diagram for an example of an energy-absorbing device.

FIG. 24 shows a motion diagram for an example of an energy absorbing device 2490. The energy absorbing device 2490 includes a ductile strip 2491 that is connected at an attachment point 2492 (e.g., attachment to a table top) and routed through a series of barriers 2493 configured to plastically deform the ductile strip 2491 upon reaching a predetermined threshold force value for payout of the ductile strip 2491. Motion of the attachment point 2492 indicated using a dotted-line arrow. Motion of the attachment point can occur after the predetermined threshold force value is met or in response to a command received from a controller.

Figure 25:
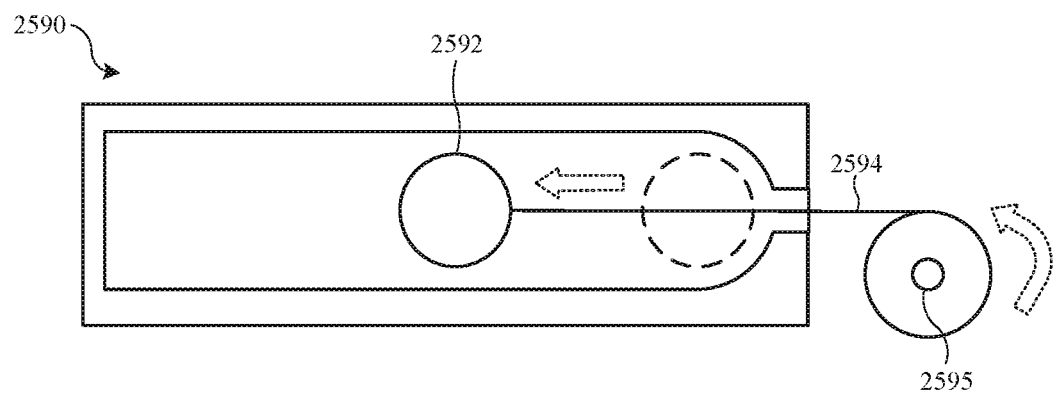
FIG. 25 shows a motion diagram for an example of an energy-absorbing device.

FIG. 25 shows a motion diagram for another example of an energy absorbing device 2590. The energy absorbing device 2590 includes a cable 2594 or other tension carrying member that is coupled to an attachment point 2592 (e.g., attachment to a table) and coiled around a spool 2595 with a torsion bar (not shown) used to control the predetermined threshold force value for payout of the cable 2594. Motion of the attachment point 2592 is indicated using dotted-line arrows. Motion of the attachment point 2592 can occur after the predetermined threshold force value is met or in response to a command to allow movement received from a controller.

Figure 26:
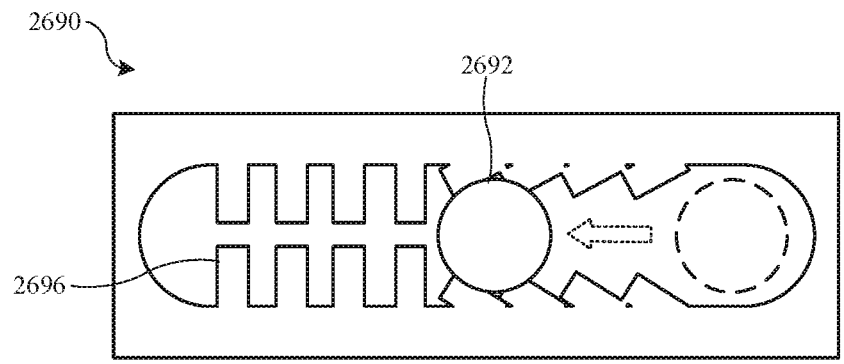
FIG. 26 shows a motion diagram for an example of an energy-absorbing device.

FIG. 26 shows a motion diagram for another example of an energy absorbing device 2690. The energy absorbing device 2690 includes energy absorbing elements in the form of notches 2696 designed with a tunable force or predetermined load threshold at which deformation in the form or compression or bending occurs. In this manner, the notches 2696 control movement of an attachment point 2692 as the attachment point 2692 passes subsequent ones of the notches 2696 and they are bent by engagement with the attachment point 2692. Motion of the attachment point 2692 can occur after the predetermined threshold force value is met or in response to a command to allow movement received from a controller.

Figure 27:
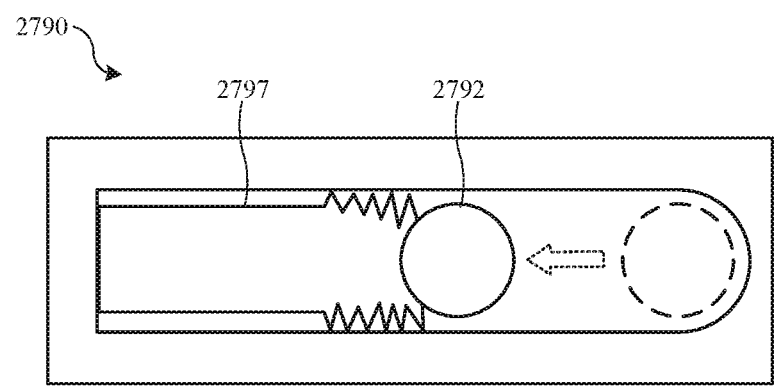
FIG. 27 shows a motion diagram for an example of an energy-absorbing device.

FIG. 27 shows a motion diagram for another example of an energy absorbing device 2790. The energy absorbing device 2790 includes an energy absorbing element in the form of a deformable element 2797 such as a honeycomb member, a deformable tube, an extruded member, or other structure with a or predetermined force threshold at which deformation in the form or compression or crumpling occurs. In this manner, the deformable element 2797 controls movement of an attachment point 2792 (e.g., attachment to a table) with motion of the attachment point 2792 indicated using a dotted-line arrow. Motion of the attachment point 2792 can occur after the predetermined threshold force value is met or in response to a command to allow movement received from a controller.

Figure 28:
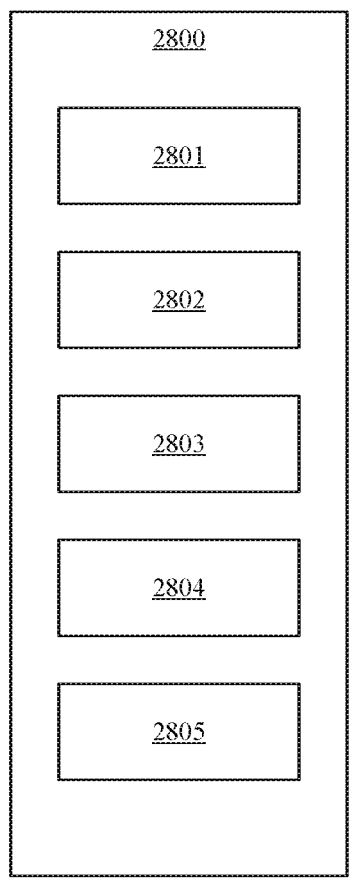
FIG. 28 is a block diagram of an example of a safety system.

FIG. 28 is a block diagram of a safety system 2800. The safety system 2800 can include a controller 2801, sensors 2802, a seat system 2803, an airbag system 2804, and a table system 2805. The safety system 2800 can include components similar to components described in reference to FIGS. 1-27. For example, the seat system 2803 can operate in a manner similar to the seat assembly 106 and may include additional seats configured similarly. The airbag system 2804 may be implemented in the manner described with respect to the airbag assembly 2307. The table system 2805 may include any of the configurations and structures described with respect to tables in the foregoing implementations, including adjustable support assemblies such as the adjustable support assembly 124. The description of the safety system 2800 is relevant to all implementations that are described herein and some or all of the features of the safety system 2800 may be included in those implementations.

The controller 2801 coordinates operation of the safety system 2800 by facilitating wired of wireless communications between included components of the safety system 2800 and/or other systems of the vehicle. The controller 2801 may receive sensor outputs (e.g., signals, data, etc.) from the sensors 2802 that provide information regarding environmental conditions outside of the vehicle 100, conditions inside of the vehicle 100, operating conditions of the vehicle 100, and/or other information. The controller 2810 may also receive information from and/or send information to other portions of the safety system 2800.

The sensors 2802 may capture or receive information related, for example, to components of the safety system 2800, to other systems of the vehicle, and/or to an environment. The environment may include the passenger cabin of the vehicle and an outside environment that is external to the vehicle. Information captured or received by the sensors 2802 can relate to seats, anchors, footrests, occupants within a vehicle, other vehicles, pedestrians and/or objects in the external environment, operating conditions of the vehicle, operating conditions of other vehicles, trajectories of other vehicles, and/or other conditions within the vehicle or exterior to the vehicle.

The safety system 2800 can control an operational mode of the table system 2805 and/or the airbag system 2804 based on a control signal, such as a signal from the controller 2801. The control signal may be based on information captured or received by the sensors 2802 and may cause various components within the safety system 2800 to change between various operational modes. The safety system 2800 may determine when and how to move, lock, unlock or otherwise control the table system 2805, and send control signals (e.g., voltage signal, command message, etc.) to the table system 2805.

The safety system 2800 may control operation of the table system 2805 to control forces incident upon the table during a vehicle event, consistent with a force value. The force value may be determined based on any one or combination of inputs including vehicle speed, external vehicle speeds, passenger mass, and passenger height. The information used to make these decisions may be supplied by the sensors 2802, including external sensing sensors and interior sensing sensors. The external sensing sensors output signals that represent observations of the environment around the vehicle 100. The external sensing sensors may include, as examples, radar sensors, LIDAR sensors, still cameras, and video cameras. The internal sensors are configured to output signals that represent observations regarding states within the passenger cabin 102 of the vehicle 100. Examples of the internal sensors include seat weight sensors, safety belt buckle switches, still cameras, and video cameras. The force value can be determined by assessing the passenger when they enter the vehicle. The force levels can be determined in response to detection of an actual or predicted vehicle event.

Some features of the safety systems described herein may be disabled under certain conditions, which can be specified by control logic and evaluated, for example, based on sensor signals.

Some or all of the motion causing (e.g., active) or motion regulating (e.g., passive) devices that are described herein may be equipped with one way locking mechanism that prevents return to the initial position. As an example, after translation of the table 120 away from the seat assembly 106, the one-way locking mechanism is engaged to restrain translation of the table 120 back toward the seat assembly 106.

Figure 29:
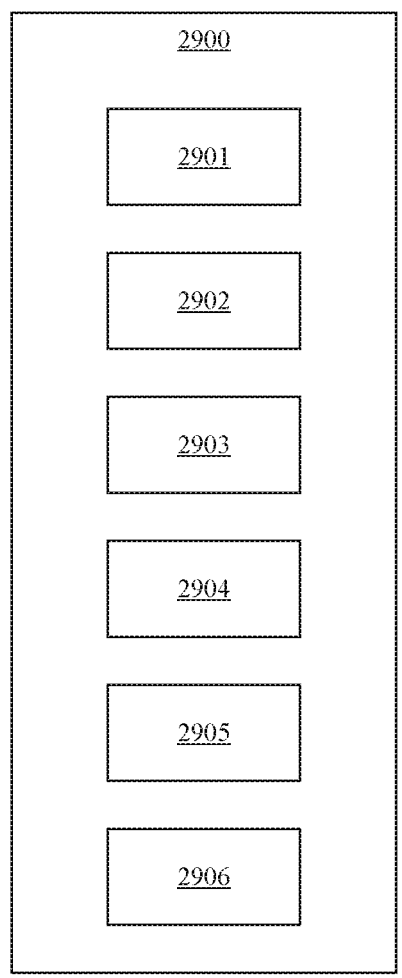
FIG. 29 is a block diagram of an example of a hardware configuration for a controller.

FIG. 29 is a block diagram that shows an example of a hardware configuration for a controller 2900 that may be used to implement the controller 2801 of the safety system and/or other portions of the safety system 2800. In the illustrated example, the controller 2900 includes a processor 2901, a memory device 2902, a storage device 2903, one or more input devices 2904, and one or more output devices 2905. These components may be interconnected by hardware such as a bus 2906 that allows communication between the components.

The processor 2901 may be a conventional device such as a central processing unit and is operable to execute computer program instructions and perform operations described by the computer program instructions. The memory device 2902 may be a volatile, high-speed, short-term information storage device such as a random-access memory module. The storage device 2903 may be a non-volatile information storage device such as a hard drive or a solid-state drive. The input devices 2904 may include sensors such as the sensors 2802 and/or any type of human-machine interface, such as buttons, switches, a keyboard, a mouse, a touchscreen input device, a gestural input device, or an audio input device. The output devices 2905 may include any type of device operable to send commands associated with an operating mode or state or provide an indication to a user regarding an operating mode or state, such as a display screen, an interface for a safety system such as the safety system 2800, or an audio output.

Figure 30:
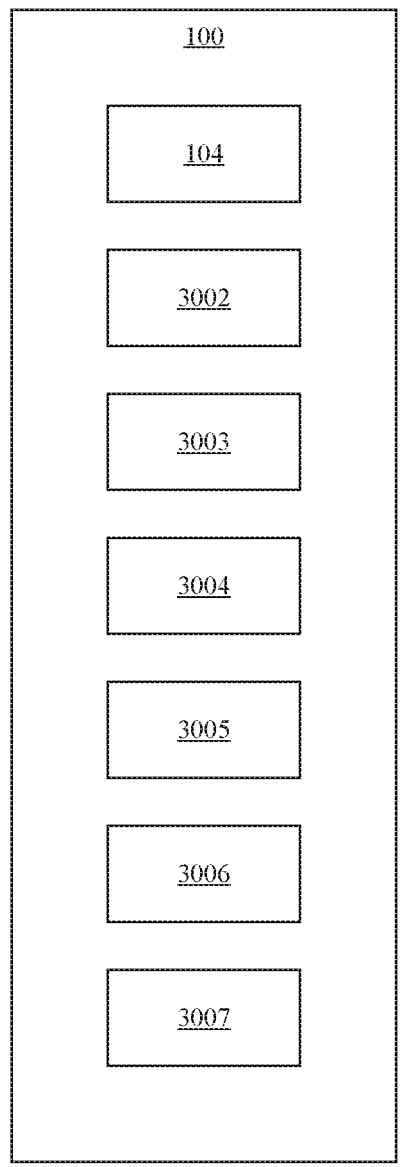
FIG. 30 is a block diagram of an example of a hardware configuration for a vehicle.

FIG. 30 is a block diagram of an example of a hardware configuration for the vehicle 100. The description of the vehicle 100 is relevant to all implementations that are described herein and some or all of the features of the vehicle 100 may be included in those implementations.

The vehicle 100 may be a conventional road-going vehicle that is supported by wheels and tires (e.g., four wheels and tires). As an example, the vehicle 100 may be a passenger vehicle that is configured to early one or more passengers. As another example, the vehicle 100 may be a cargo vehicle that is configured to carry cargo items.

In the illustrated implementation, the vehicle 100 includes the body structure 104, a suspension system 3002, a propulsion system 3003, a braking system 3004, a steering system 3005, a sensing system 3006, and a control system 3007. These are examples of vehicle systems that are included in the vehicle 100. Other systems can be included in the vehicle 100.

The body structure 104 is a structural component of the vehicle 100 through which other components are interconnected and supported. The body structure 104 may, for example, include or define the passenger cabin 102, as previously described. The body structure 104 may include structural components (e.g., a frame, subframe, unibody, monocoque, etc.) and aesthetic components (e.g., exterior body panels).

The suspension system 3002 supports a sprung mass of the vehicle 100 with respect to an unsprung mass of the vehicle 100. The suspension system 3002 is an active suspension system that is configured to control generally vertical motion of the wheels. Broadly speaking, the suspension system 3002 controls vertical motion of the wheels of the vehicle 100 relative to the body structure 104, for example, to ensure contact between the wheels and a surface of a roadway and to reduce undesirable movements of the body structure 104. The suspension system 3002 includes components (e.g., actuators) that are configured to transfer energy into and absorb energy from the wheels, such as by applying upward and downward forces to introduce energy into and absorb energy from the wheels. The components of the suspension system 3002 may be operated in accordance with signals from sensors in the sensing system 3006 and under control from the control system 3007, for example, in the form of commands transmitted from the control system 3007 to the suspension system 3002.

The propulsion system 3003 includes propulsion components that are configured to cause motion of the vehicle 100 (e.g., accelerating the vehicle 100). The propulsion system 3003 may include components such that are operable to generate torque and deliver that torque to one or more wheels (e.g., road wheels that contact the road through tires mounted on the road wheels). Examples of components that may be included in the propulsion system 3003 include motors, gearboxes, and propulsion linkages (e.g., drive shafts, half shafts, etc.). Motors included in the propulsion system 3003 may be, as examples, an internal combustion engine powered by a combustible fuel or one or more electric motors that are powered by electricity (e.g., from a battery). Electric motors that are included in the propulsion system 3003 may further be configured to operate as generators that charge the battery in a regenerative braking configuration.

The braking system 3004 provides deceleration torque for decelerating the vehicle 100. The braking system 3004 may include friction braking components such as disk brakes or drum brakes. The braking system 3004 may use an electric motor of the propulsion system to decelerate the vehicle by electromagnetic resistance, which may be part of battery charging in a regenerative braking configuration.

The steering system 3005 is operable to cause the vehicle to turn (e.g., change direction) by changing a steering angle of one or more wheels of the vehicle 100. As one example, one or more wheels of the vehicle may each include an independently operated steering actuator. As another example, two wheels of the vehicle 100 may be connected by steering linkages to a single steering actuator or to a manually operated steering device.

The sensing system 3006 includes sensors for observing external conditions of the environment around the vehicle 100 (e.g., location of the roadway and other objects) and conditions of the vehicle 100 (e.g., acceleration and conditions of the various systems and their components). The sensing system 3006 may include sensors of various types, including dedicated sensors and/or components of the various systems. For example, actuators may incorporate sensors or portions of actuators may function as sensors such as by measuring current draw of an electric motor incorporated in an actuator. The suspension system 3002 may, for example, be controlled using acceleration sensors that are connected to a sprung mass of the vehicle 100, to an unsprung mass of the vehicle 100, and/or to one or more suspension actuators of the vehicle 100.

The control system 3007 includes communication components (i.e., for receiving sensor signals and sending control signals) and processing components (i.e., for processing the sensor signals and determining control operations), such as a controller. The control system 3007 may be a single system or multiple related systems. For example, the control system 3007 may be a distributed system including components that are included in other systems of the vehicle 100, such as the suspension system 3002, the propulsion system 3003, the braking system 3004, the steering system 3005, the sensing system 3006, and/or other systems.

As used herein, the language "at least one of A or B" should be interpreted to mean "at least one of A or at least one of B" as opposed to requiring "at least one A and at least one B."

As described above, one aspect of the present technology is the gathering and use of data available from various sources, sensors, or user profiles, to operate portions of the safety system. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of personal information data, in the present technology, can be used to the benefit of users. For example, the personal information data can be used to customization operation of the safety system according to user information. Other uses for personal information data that benefit the user are also possible. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing, should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of user-profile-based safety systems, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading air app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. in addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can be implemented without the need for accessing such personal information data. That is, the various embodiments of the present technology are not rendered inoperable due to the lack of all or a portion of such personal information data. For example, the safety system can be operated based on non-personal information data, a bare minimum amount of personal information, other non-personal information available to the system, or publicly available information.

What is claimed is:

1. A vehicle, comprising:
   an interior wall;
   a seat;
   a table located adjacent to the seat, wherein the table includes a table top that is movable relative to the interior wall between a retracted position and a deployed position, with a majority of the table top located outside of a cavity defined by the interior wall in the deployed position and with a majority of the table top located in the cavity in the retracted position; and
   a translational stage configured to allow movement of the table top between the deployed position and the retracted position,
   wherein the table top is configured to be locked in the deployed position, and the table top is configured to be unlocked in response to a vehicle event.

2. The vehicle of claim 1, wherein the translational stage includes an actuator that is configured to move the table between the deployed position and the retracted position.

3. The vehicle of claim 2, wherein the actuator is controllable to move the table top from the deployed position to the retracted position in response to detection of the vehicle event.

4. The vehicle of claim 2, wherein the actuator is an electromechanical actuator.

5. The vehicle of claim 1, wherein the translational stage is configured to allow movement of the table top from the deployed position to the retracted position in response to a force applied to the table top.

6. The vehicle of claim 5, wherein the translational stage includes an energy absorbing device that controls motion of the table top to absorb energy in response to the force applied to the table top.

7. A vehicle, comprising:
   an interior wall;
   a seat; and
   a table that is located adjacent to the seat, wherein the table includes a table top having a first portion that is connected to the interior wall and a second portion that is telescopically related to the first portion,
   wherein the second portion of the table top is nested within the first portion of the table top when the table top is in a retracted position, and the second portion of the table top is located outside of the first portion of the table top when the table top is in a deployed position.

8. The vehicle of claim 7, wherein the second portion of the table top is configured to slide with respect to the first portion of the table top between the retracted position and the deployed position.

9. The vehicle of claim 8, wherein the second portion of the table top is closer to the seat in the deployed position than in the retracted position.

10. The vehicle of claim 8, wherein the second portion of the table top is configured to move from the deployed position to the retracted position in response to a force applied to the second portion of the table top.

11. The vehicle of claim 8, further comprising:
    a translational stage that is configured to allow movement of the second portion of the table top between the deployed position and the retracted position.

12. The vehicle of claim 11, wherein the translational stage includes an actuator that is configured to move the table between the deployed position and the retracted position.

13. The vehicle of claim 12, wherein the actuator is controllable to move the table top from the deployed position to the retracted position in response to detection of a vehicle event.

14. The vehicle of claim 11, wherein the translational stage includes an energy absorbing device that is configured to control motion of the second portion of the table top to absorb energy in response to a force applied to the second portion of the table top.

15. A vehicle, comprising:
    a body including an interior wall that defines a passenger cabin;
    a seat that is located in the passenger cabin; and
    a table that includes a table top, the table top including:
       a first portion coupled to the interior wall by a first pivot joint, and
       a second portion coupled to the first portion by a second pivot joint, wherein the table is movable between a retracted position and a deployed position by rotation of the first portion of the table top with respect to the interior wall and by rotation of the second portion of the table top with respect to the first portion of the table top.

16. The vehicle of claim 15, wherein the first pivot joint and the second pivot joint include actuators that are configured to move the table between the retracted position and the deployed position.

17. The vehicle of claim 16, wherein the actuators of the first pivot joint and the second pivot joint are controllable to move the table between the retracted position and the deployed position in response to detection of a vehicle event.

18. The vehicle of claim 15, wherein the first pivot joint and the second pivot joint each includes an energy absorbing device that is configured to control motion of the second portion of the table top to absorb energy in response to a force applied to the second portion of the table top.

19. The vehicle of claim 18, wherein the energy absorbing device is configured to absorb the energy by deformation.

20. The vehicle of claim 15, wherein the first pivot joint and the second pivot joint are configured to move the table between the retracted position and the deployed position in response to application of a force to the second portion of the table top.

* * * * *